United States Patent
Lou et al.

(10) Patent No.: US 12,225,452 B2
(45) Date of Patent: Feb. 11, 2025

(54) SIGNAL TRANSMISSION METHOD AND APPARATUS

(71) Applicant: HUAWEI TECHNOLOGIES CO., LTD., Shenzhen (CN)

(72) Inventors: Chong Lou, Shanghai (CN); Qiang Fan, Shanghai (CN); Xiaoying Xu, Shenzhen (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/707,225

(22) Filed: Mar. 29, 2022

(65) Prior Publication Data
US 2022/0225222 A1 Jul. 14, 2022

Related U.S. Application Data

(63) Continuation of application No. PCT/CN2019/109686, filed on Sep. 30, 2019.

(51) Int. Cl.
*H04W 48/16* (2009.01)
*H04W 48/06* (2009.01)

(52) U.S. Cl.
CPC ........... *H04W 48/16* (2013.01); *H04W 48/06* (2013.01)

(58) Field of Classification Search
CPC ...... H04W 48/04; H04W 48/10; H04W 48/16
See application file for complete search history.

(56) References Cited

U.S. PATENT DOCUMENTS

| | | |
|---|---|---|
| 2009/0163223 A1 | 6/2009 | Casey |
| 2011/0199905 A1 | 8/2011 | Pinheiro et al. |
| 2015/0043516 A1* | 2/2015 | Liu ............ H04W 48/06 370/329 |
| 2017/0318562 A1* | 11/2017 | Pang ............ H04W 72/04 |
| 2018/0192300 A1 | 7/2018 | Kazmi et al. |
| 2019/0090227 A1 | 3/2019 | Tsai et al. |
| 2019/0149308 A1* | 5/2019 | Son ............ H04L 5/0007 375/260 |
| 2019/0208429 A1 | 7/2019 | Hong |

FOREIGN PATENT DOCUMENTS

| | | |
|---|---|---|
| CN | 102474777 A | 5/2012 |
| CN | 104363598 A | 2/2015 |

(Continued)

OTHER PUBLICATIONS

Extended European Search Report issued in corresponding European Application No. 19947596.3, dated Aug. 19, 2022, pp. 1-14.

(Continued)

*Primary Examiner* — Kevin Kim
(74) *Attorney, Agent, or Firm* — HAUPTMAN HAM, LLP

(57) ABSTRACT

A signal transmission method includes receiving configuration information from a network device. The configuration information is used to indicate a serving cell that is allowed or forbidden to be used by a terminal for a first service or first control information. The method also includes adjusting the serving cell that is allowed or forbidden to be used by the terminal for the first service or the first control information. The method further includes transmitting the first service or the first control information by using an adjusted serving cell.

20 Claims, 9 Drawing Sheets

(56) References Cited

FOREIGN PATENT DOCUMENTS

| CN | 108024310 A | 5/2018 |
|---|---|---|
| CN | 109618414 A | 4/2019 |
| EP | 3010297 A1 | 4/2016 |
| EP | 3461025 A1 | 3/2019 |
| WO | 2012067333 A1 | 5/2012 |
| WO | 2019050352 A1 | 3/2019 |
| WO | 2019140636 A1 | 7/2019 |

OTHER PUBLICATIONS

Huawei, HiSilicon, User plane aspects for NR-based access to unlicensed specturm. 3GPP TSG-RAN WG2 Meeting 101bis, Sanya, China, Apr. 16-Apr. 20, 2018, R2-1805817, 4 pages.

3GPP TS 38.322 V15.5.0 (Mar. 2019), 3rd Generation Partnership Project; Technical Specification Group Radio Access Network; NR; Radio Link Control (RLC) protocol specification(Release 15), 33 pages.

International Search Report issued in corresponding International Application No. PCT/CN2019/109686, dated Jun. 30, 2020, pp. 1-9.

* cited by examiner

SIGNAL TRANSMISSION METHOD AND APPARATUS

CROSS-REFERENCE TO RELATED APPLICATIONS

This application is a continuation of International Application No. PCT/CN2019/109686, filed on Sep. 30, 2019, the disclosure of which is hereby incorporated by reference in its entirety.

TECHNICAL FIELD

This application relates to the communications field, and more specifically, to a signal transmission method and an apparatus.

BACKGROUND

As a quantity of intelligent terminals explosively increases, a problem that existing licensed frequency bands are increasingly insufficient becomes more serious. In the conventional solution, an unlicensed frequency band is introduced, so that an operator with insufficient licensed frequency spectrums can offload data, and better coverage and capacity are obtained. For example, a long term evolution (long term evolution, LTE) licensed-assisted access (licensed-assisted access, LAA) operation is introduced to a 4th generation (4th generation, 4G) mobile communications system. To be specific, an unlicensed frequency band cell is configured as a secondary cell (secondary cell, SCell) for carrier aggregation (carrier aggregation, CA), and may also be referred to as an LAA SCell for short.

Specifically, a network device restricts a service sent by the terminal in uplink. To be specific, the network device may determine, based on a logical channel corresponding to the service, whether to allow the service to be transmitted by using the LAA SCell, to configure "cell usage restriction information". If the network device allows the service to be transmitted by using the LAA SCell, an LAA-UL-allowed information element configured by the network device is set to "TRUE (TRUE)". Correspondingly, the terminal determines, based on the LAA-UL-allowed information element, that the corresponding service can be sent by using the LAA SCell. If the network device does not allow the service to be transmitted by using the LAA SCell, the LAA-UL-allowed information element configured by the network device is set to "FALSE (FALSE)". Correspondingly, the terminal determines, based on the LAA-UL-allowed information element, that the corresponding service cannot be sent by using the LAA SCell. For example, the terminal can send the service by using only a licensed cell (licensed cell).

Services transmitted between the terminal and the network device usually include an ultra-reliable and low-latency communications (ultra reliable and low latency communications, URLLC) service and a massive machine type communication (massive machine type communications, mMTC) service. Because the URLLC service has a low-latency transmission requirement, the network device sets the LAA-UL-allowed information element to "FALSE" for the URLLC service, and sets the LAA-UL-allowed information element to "TRUE" for an enhanced mobile broadband (enhanced mobile broadband, eMBB) service, so that the URLLC service is sent by using only a licensed cell, and the eMBB service is sent by using only an LAA SCell. In this way, "hard isolation" of transmission resources for the URLLC service and the eMBB service is implemented.

However, transmission of the URLLC service is not continuous, causing a waste of licensed cell resources. In other words, frequency spectrum utilization and a throughput of a system are low.

SUMMARY

In view of this, this application provides a signal transmission method and an apparatus, to improve frequency spectrum utilization of a system or improve a throughput of the system.

According to a first aspect, a signal transmission method is provided. The method includes: receiving configuration information from a network device, where the configuration information is used to indicate a serving cell that is allowed or forbidden to be used by a terminal for a first service or first control information; adjusting the serving cell that is allowed or forbidden to be used by the terminal for the first service or the first control information; and transmitting the first service or the first control information by using an adjusted serving cell.

After receiving the configuration information that is used to indicate the serving cell that is allowed or forbidden to be used for the first service, the terminal may dynamically and flexibly adjust the serving cell for the first service, and transmit the first service by using the adjusted serving cell. In this way, compared with the conventional solution in which hard isolation is used and services of a same type can be sent by using only a fixed serving cell, this embodiment of this application can improve frequency spectrum utilization and a throughput of a system.

In some possible implementations, the adjusting the serving cell that is allowed or forbidden to be used by the terminal for the first service or the first control information includes: when a second service or second control information arrives, adjusting the serving cell that is allowed or forbidden to be used by the terminal for the first service or the first control information.

When detecting that a new service arrives, the terminal may adjust the serving cell that is allowed or forbidden to be used for the first service that is currently being processed. In this way, a capability of the terminal to simultaneously process a plurality of services is improved.

In some possible implementations, the second service or the second control information is a service or control information whose transmission delay requirement is less than or equal to a preset delay threshold, and the first service or the first control information is a service or control information whose transmission delay requirement is greater than the preset delay threshold; or a priority of the second service or the second control information is higher than a priority of the first service or the first control information; or a priority level of the second service or the second control information is higher than a preset priority level.

If the second service that has a higher transmission delay requirement arrives, the terminal may adjust the serving cell for the first service having a lower transmission delay requirement, so that the second service is preferably sent. In this way, quality of service and transmission efficiency of the second service having the higher delay requirement are ensured. When a high-priority service arrives, the terminal may adjust a serving cell for a low-priority service, so that more serving cells can serve the high-priority service. In this way, transmission efficiency of the high-priority service is improved.

In some possible implementations, the adjusting the serving cell that is allowed or forbidden to be used by the terminal for the first service or the first control information includes: adjusting, based on a current channel state, the serving cell that is allowed or forbidden to be used by the terminal for the first service or the first control information, where the channel state is a state of a channel corresponding to an unlicensed cell and/or a state of a channel corresponding to a licensed cell.

The terminal may adjust, more properly with reference to the current channel state, the serving cell that is allowed or forbidden to be used by the terminal for the first service. In this way, overall communication performance is further improved.

In some possible implementations, the adjusting, based on a current channel state, the serving cell that is allowed or forbidden to be used by the terminal for the first service or the first control information includes: when a channel state of the unlicensed cell is greater than or equal to a preset threshold, adjusting the serving cell, so that the unlicensed cell is allowed to be used by the terminal for the first service or the first control information.

When determining that the unlicensed cell can also ensure communication quality of the first service, the terminal may provide the licensed cell for a service with a higher priority. In this way, overall communication efficiency and communication quality are improved.

In some possible implementations, the adjusting the serving cell that is allowed or forbidden to be used by the terminal for the first service or the first control information includes: adjusting, based on current load of the terminal, the serving cell that is allowed or forbidden to be used by the terminal for the first service or the first control information.

The terminal may flexibly adjust, based on the current load, the serving cell that is allowed or forbidden to be used for the first service. In this way, a throughput of a system is improved.

In some possible implementations, the adjusting, based on current load, the serving cell that is allowed or forbidden to be used by the terminal for the first service or the first control information includes: when the current load of the terminal is greater than or equal to a preset threshold, adjusting the serving cell, so that an unlicensed cell is allowed to be used by the first terminal for the first service or the first control information.

If the current load is relatively high, the terminal adjusts the serving cell, so that the first service occupies some unlicensed cells, to avoid congestion caused because the first service with a lower priority occupies a licensed cell when the load is relatively high. In this way, a throughput of a system is ensured.

In some possible implementations, the method further includes: receiving indication information, where the indication information is used to indicate the serving cell that is allowed or forbidden to be used by the terminal for the first service or the first control information; and the adjusting the serving cell that is allowed or forbidden to be used by the terminal for the first service or the first control information includes: adjusting, based on the indication information, the serving cell that is allowed or forbidden to be used by the terminal for the first service or the first control information.

The network device may determine the serving cell that can be used for the first service, and notify the terminal of the serving cell by using the indication information, so that the terminal can adjust the serving cell for the first service based on the indication information. In this way, power consumption overheads of the terminal are reduced.

In some possible implementations, the indication information includes a serving cell identifier, a cell list identifier, or a cell type identifier, and a cell list corresponding to the cell list identifier includes at least one serving cell identifier.

The network device may adjust, based on the indication information, the serving cell that can be used for the first service, where the serving cell may be in a form of a serving cell, a cell set (that is, in a form of a cell list), or a cell type. The network device may flexibly select, based on an adjustment manner, specific content included in the indication information, and may use a cell list manner or a cell type manner when large-granularity adjustment is to be performed. In this way, relatively large signaling overheads caused by indication of a single serving cell are avoided. Alternatively, when small-granularity adjustment is to be performed, the network device may use a serving cell identifier manner. In this way, adjustment can be performed more precisely, and adjustment precision is improved.

In some possible implementations, the adjusting the serving cell that is allowed or forbidden to be used by the terminal for the first service or the first control information includes: adjusting, in a packet data convergence protocol PDCP entity, the serving cell that is allowed or forbidden to be used by the terminal for the first service or the first control information, where the PDCP entity is associated with at least two RLC entities, or is associated with an RLC entity and an LWAAP entity; and sending the first service or the first control information to a target RLC entity in the at least two RLC entities, where the target RLC entity corresponds to the adjusted serving cell; or sending the first service or the first control information to an RLC entity corresponding to the adjusted serving cell or to an LWAAP entity corresponding to the adjusted serving cell.

After the PDCP entity adjusts the serving cell that is allowed or forbidden to be used by the terminal for the first service, the terminal sends the first service to the target RLC entity in the at least two RLC entities associated with the PDCP entity. If the second service exists, the terminal sends the second service to another RLC in the at least two RLC entities. After the serving cell for the first service is adjusted, service offloading processing is performed, so that interference between different services can be avoided. Because the first service and the second service are processed by different RLC entities, processing efficiency of the first service and the second service can also be improved.

After the PDCP entity adjusts the serving cell that is allowed or forbidden to be used by the terminal for the first service, the terminal sends the first service to a long term evolution-wireless local area network aggregation adaptation protocol entity associated with the PDCP entity. If the second service exists, the terminal sends the second service to an RLC entity associated with the PDCP entity. After the serving cell for the first service is adjusted, service offloading processing is performed, so that interference between different services can be avoided. In addition, a throughput for the first service can be ensured while QoS of the second service is ensured.

In some possible implementations, the adjusting the serving cell that is allowed or forbidden to be used by the terminal for the first service or the first control information includes: adjusting, at a media access control MAC layer, the serving cell that is allowed or forbidden to be used by the terminal for the first service or the first control information.

The terminal may adjust, at the MAC layer, the serving cell that is allowed or forbidden to be used by the terminal for the first service. After the serving cell for the first service is adjusted, service offloading processing is performed, so that interference between different services can be avoided.

In addition, a throughput for the first service can be ensured while QoS of the second service is ensured.

In some possible implementations, the configuration information is used to indicate a plurality of lists of serving cells that are allowed or forbidden to be used by the terminal for the first service or the first control information, and the adjusted serving cell is a serving cell in one of the plurality of lists of the serving cells that are indicated by the configuration information.

The terminal may learn of a plurality of restriction manners based on the configuration information, and subsequently, the terminal may flexibly select a proper restriction manner from the plurality of restriction manners to restrict the serving cell. In this way, system performance is further improved.

In some possible implementations, the first control information or the second control information includes at least one of signaling radio bearer SRB bearer signaling, common control channel CCCH bearer signaling, service data adaptation protocol SDAP signaling, packet data convergence protocol PDCP signaling, radio link control protocol RLC signaling, and media access control MAC signaling.

According to a second aspect, a signal transmission method is provided. The method includes: determining a serving cell that is allowed or forbidden to be used by a terminal for a first service or first control information; and sending indication information to the terminal, where the indication information is used to indicate the serving cell that is allowed or forbidden to be used by the terminal for the first service or the first control information.

The network device may determine the serving cell that can be used for the first service, and notify the terminal of the serving cell by using the indication information, so that the terminal can adjust the serving cell for the first service based on the indication information. In this way, power consumption overheads of the terminal are reduced.

In some possible implementations, the indication information includes a serving cell identifier, a cell list identifier, or a cell type identifier, and a cell list corresponding to the cell list identifier includes at least one serving cell identifier.

The network device may adjust, based on the indication information, the serving cell that can be used for the first service, where the serving cell may be in a form of a serving cell, a cell set (that is, in a form of a cell list), or a cell type. The network device may flexibly select, based on an adjustment manner, specific content included in the indication information, and may use a cell list manner or a cell type manner when large-granularity adjustment is to be performed. In this way, relatively large signaling overheads caused by indication of a single serving cell are avoided. Alternatively, when small-granularity adjustment is to be performed, the network device may use a serving cell identifier manner. In this way, adjustment can be performed more precisely, and adjustment precision is improved.

In some possible implementations, the determining a serving cell that is allowed or forbidden to be used by a terminal for a first service or first control information includes: determining, based on a detection result of detecting whether a second service or second control information arrives at the terminal, the serving cell that is allowed or forbidden to be used by the terminal for the first service or the first control information.

When detecting that a new service arrives at the terminal, the network device may adjust the serving cell that is allowed or forbidden to be used for the first service that is currently being processed. In this way, a capability of the terminal to simultaneously process a plurality of services is improved.

In some possible implementations, the second service or the second control information is a service or control information whose transmission delay requirement is less than or equal to a preset delay threshold, and the first service or the first control information is a service or control information whose transmission delay requirement is greater than the preset delay threshold; or a priority of the second service or the second control information is higher than a priority of the first service or the first control information; or a priority level of the second service or the second control information is higher than a preset priority level.

If the network device detects that the second service having a lower transmission delay requirement arrives, the network device may adjust, based on the indication information, the serving cell for the first service having a higher transmission delay requirement, so that the second service is preferably sent. In this way, quality of service and transmission efficiency of the second service having the higher delay requirement are ensured. If the network device detects arrival of a high-priority service, the network device may adjust a serving cell for a low-priority service based on the indication information, so that more serving cells can serve the high-priority service. In this way, transmission efficiency of the high-priority service is improved.

In some possible implementations, the determining a serving cell that is allowed or forbidden to be used by the terminal for a first service or first control information includes: determining, based on a current channel state, the serving cell that is allowed or forbidden to be used by the terminal for the first service or the first control information, where the channel state is a state of a channel corresponding to an unlicensed cell and/or a state of a channel corresponding to a licensed cell.

The network device may adjust, more properly with reference to the current channel state, the serving cell that is allowed or forbidden to be used by the terminal for the first service. In this way, overall communication performance is further improved.

In some possible implementations, the determining, based on a current channel state, the serving cell that is allowed or forbidden to be used by the terminal for the first service or the first control information includes: when a channel state of the unlicensed cell is greater than or equal to a preset threshold, determining that the serving cell that is allowed to be used by the terminal for the first service or the first control information is the unlicensed cell.

If the network device detects that the unlicensed cell can also ensure communication quality of the first service, the network device may provide the licensed cell for a service with a higher priority. In this way, overall communication efficiency and communication quality are improved.

In some possible implementations, the determining a serving cell that is allowed or forbidden to be used by the terminal for a first service or first control information includes: determining, based on current load of the terminal, the serving cell that is allowed or forbidden to be used by the terminal for the first service or the first control information.

The network device may flexibly adjust, based on the current load of the terminal and the indication information, the serving cell that is allowed or forbidden to be used for the first service. In this way, a throughput of a system is improved.

In some possible implementations, the determining, based on current load, the serving cell that is allowed or forbidden to be used by the terminal for the first service or the first control information includes: when the current load of the terminal is greater than or equal to a preset threshold, determining that the serving cell that is allowed to be used by the terminal for the first service or the first control information is an unlicensed cell.

If the current load of the terminal is relatively high, the network device adjusts the serving cell, so that the first service occupies some unlicensed cells, to avoid congestion caused because the first service with a lower priority occupies a licensed cell when the load is relatively high. In this way, a throughput of a system is ensured.

In some possible implementations, the first control information or the second control information includes at least one of signaling radio bearer SRB bearer signaling, common control channel CCCH bearer signaling, service data adaptation protocol SDAP signaling, packet data convergence protocol PDCP signaling, radio link control protocol RLC signaling, and media access control MAC signaling.

According to a third aspect, a signal transmission apparatus is provided. The apparatus may be a terminal, or a chip used for a terminal, for example, a chip that can be disposed in the terminal. The apparatus has a function of implementing any one of the first aspect and the possible implementations of the first aspect. The function may be implemented by hardware, or may be implemented by hardware executing corresponding software. The hardware or the software includes one or more modules corresponding to the function.

In a possible design, the apparatus includes a processing module and a transceiver module. The transceiver module may be, for example, at least one of a transceiver, a receiver, and a transmitter. The transceiver module may include a receiving module and a sending module, and may specifically include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the communication method according to any one of the first aspect and the possible implementations of the first aspect. In this design, the apparatus may be the terminal.

In another possible design, when the apparatus is a chip, the chip includes a processing module and a transceiver module. The transceiver module may be, for example, an input/output interface, a pin, or a circuit in the chip. The processing module may be, for example, a processor. The processing module may execute instructions, to enable the chip in the terminal to perform the communication method according to any one of the first aspect and the possible implementations of the first aspect. Optionally, the processing module may execute instructions in a storage module, and the storage module may be a storage module in the chip, for example, a register or a buffer. The storage module may alternatively be located inside a communications device but outside the chip, for example, a read-only memory (read-only memory, ROM) or another type of static storage device that can store static information and instructions, or a random access memory (random access memory, RAM).

The processor mentioned anywhere above may be a general-purpose central processing unit (CPU), a microprocessor, an application-specific integrated circuit (application-specific integrated circuit, ASIC), or one or more integrated circuits configured to control program execution of the communication method according to any one of the first aspect and the possible implementations of the first aspect.

According to a fourth aspect, a signal transmission apparatus is provided. The apparatus may be a network device, or a chip used in a network device, for example, a chip that can be disposed in the network device. The apparatus has a function of implementing any one of the second aspect and the possible implementations of the second aspect. The function may be implemented by hardware, or may be implemented by hardware executing corresponding software. The hardware or the software includes one or more modules corresponding to the function.

In a possible design, the apparatus includes a transceiver module and a processing module. The transceiver module may be, for example, at least one of a transceiver, a receiver, and a transmitter. The transceiver module may include a receiving module and a sending module, and may specifically include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the method according to any one of the second aspect or the possible implementations of the second aspect.

In another possible design, when the apparatus is a chip, the chip includes a transceiver module and a processing module. The transceiver module may be, for example, an input/output interface, a pin, or a circuit in the chip. The processing module may be, for example, a processor. The processing module may execute instructions, to enable the chip in the network device to perform the communication method according to any one of the second aspect and the possible implementations of the second aspect.

Optionally, the processing module may execute instructions in a storage module, and the storage module may be a storage module in the chip, for example, a register or a buffer. The storage module may alternatively be located inside a communications device but outside the chip, for example, a read-only memory (read-only memory, ROM) or another type of static storage device that can store static information and instructions, or a random access memory (random access memory, RAM).

Any processor mentioned above may be a general-purpose central processing unit (CPU), a microprocessor, an application-specific integrated circuit (application-specific integrated circuit, ASIC), or one or more integrated circuits configured to control program execution of the communication methods according to the foregoing aspects.

According to a fifth aspect, an apparatus is provided, including a module configured to implement the method according to any one of the first aspect and the possible implementations of the first aspect.

According to a sixth aspect, an apparatus is provided, including a module configured to implement the method according to any one of the second aspect and the possible implementations of the second aspect.

According to a seventh aspect, an apparatus is provided, including a processor, configured to invoke a program stored in a memory, to perform the method according to any one of the first aspect and the possible implementations of the first aspect.

According to an eighth aspect, an apparatus is provided, including a processor, configured to invoke a program stored in a memory, to perform the method according to any one of the second aspect and the possible implementations of the second aspect.

According to a ninth aspect, an apparatus is provided, including a processor and an interface circuit, where the processor is configured to communicate with another apparatus by using the interface circuit, and perform the method according to any one of the first aspect and the possible implementations of the first aspect.

According to a tenth aspect, an apparatus is provided, including a processor and an interface circuit, where the processor is configured to communicate with another apparatus by using the interface circuit, and perform the method according to any one of the second aspect and the possible implementations of the second aspect.

According to an eleventh aspect, a terminal is provided, including the apparatus according to any one of the fifth aspect, the seventh aspect, the ninth aspect, or the possible implementations of the fifth aspect, the seventh aspect, or the ninth aspect.

According to a twelfth aspect, a network device is provided, including the apparatus according to any one of the sixth aspect, the eighth aspect, the tenth aspect, or the possible implementation of the sixth aspect, the eighth aspect, or the tenth aspect.

According to a thirteenth aspect, a computer storage medium is provided, where the computer storage medium stores instructions, and when the instructions are run, the method according to any one of the first aspect and the possible implementations of the first aspect is implemented.

According to a fourteenth aspect, a computer storage medium is provided, where the computer storage medium stores instructions, and when the instructions are run, the method according to any one of the second aspect and the possible implementations of the second aspect is implemented.

According to a fifteenth aspect, a computer storage medium is provided. The computer storage medium stores program code, and the program code is used to indicate instructions for performing the method according to any one of the first aspect and the possible implementations of the first aspect.

According to a sixteenth aspect, a computer storage medium is provided. The computer storage medium stores program code, and the program code is used to indicate instructions for performing the method according to any one of the second aspect and the possible implementations of the second aspect.

According to a seventeenth aspect, a computer program product including instructions is provided. When the computer program product runs on a processor, a computer is enabled to perform the method according to any one of the first aspect or the possible implementations of the first aspect.

According to an eighteenth aspect, a computer program product including instructions is provided. When the computer program product runs on a processor, a computer is enabled to perform the method according to any one of the second aspect or the possible implementations of the second aspect.

According to a nineteenth aspect, a communications system is provided. The communications system includes an apparatus that has a function of implementing the method and various possible designs according to the first aspect and an apparatus that has a function of implementing the method and various possible designs according to the second aspect.

Based on the foregoing technical solution, after receiving the configuration information that is used to indicate the serving cell that is allowed or forbidden to be used for the first service, the terminal may dynamically and flexibly adjust the serving cell for the first service, and transmit the first service by using the adjusted serving cell. In this way, compared with the conventional solution in which hard isolation is used and services of a same type can be sent by using only a fixed serving cell, this embodiment of this application can improve frequency spectrum utilization and a throughput of a system.

DESCRIPTION OF EMBODIMENTS

Figure 1:
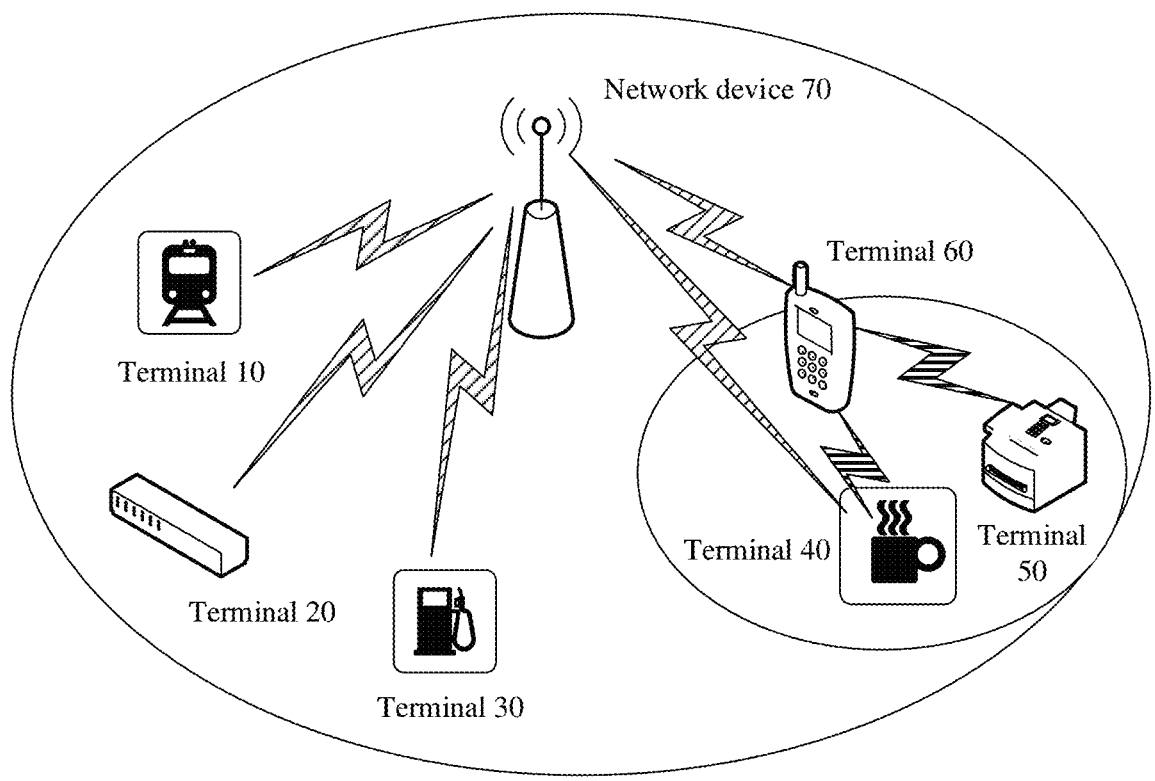
FIG. 1 is a schematic diagram of a communications system according to this application.

The following describes technical solutions in this application with reference to the accompanying drawings.

The technical solutions in embodiments of this application may be applied to various communications systems, for example, a long term evolution (long term evolution, LTE)

system, an LTE frequency division duplex (frequency division duplex, FDD) system, an LTE time division duplex (time division duplex, TDD) system, a fifth generation (5th generation, 5G) system or a new radio (new radio, NR) system, and a future mobile communications system.

A terminal in embodiments of this application may be a device having a wireless transceiver function, and may be referred to as a terminal (terminal), user equipment (user equipment, UE), a mobile station (mobile station, MS), a mobile terminal (mobile terminal, MT), an in-vehicle terminal, a remote station, a remote terminal, or the like. A specific form of the terminal may be a mobile phone (mobile phone), a cellular phone, a cordless phone, a session initiation protocol (session initiation protocol, SIP) phone, a wearable device, a tablet computer (pad), a desktop computer, a notebook computer, an all-in-one machine, a vehicle-mounted terminal, a wireless local loop (wireless local loop, WLL) station, a personal digital assistant (personal digital assistant, PDA), or the like. The terminal may be used in the following scenario: virtual reality (virtual reality, VR), augmented reality (augmented reality, AR), industrial control (industrial control), self driving (self driving), remote surgery (remote medical surgery), a smart grid (smart grid), transportation safety (transportation safety), a smart city (smart city), a smart home (smart home), or the like. The terminal may be a fixed terminal or a mobile terminal. It should be noted that the terminal may support at least one wireless communications technology, such as LTE, NR, or wideband code division multiple access (wideband code division multiple access, WCDMA).

The network device is a device in a wireless network, for example, a radio access network (radio access network, RAN) node that enables the terminal to access the wireless network. Currently, some examples of the RAN node are: a gNB, a transmission reception point (transmission reception point, TRP), an evolved NodeB (evolved NodeB, eNB), a radio network controller (radio network controller, RNC), a NodeB (Node B, NB), a base station controller (base station controller, BSC), a base transceiver station (base transceiver station, BTS), a home NodeB (for example, a home evolved NodeB or a home Node B, HNB), a base band unit (base band unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including a CU node and a DU node. The network device may support at least one wireless communication technology, such as LTE, NR, or WCDMA.

In some deployments, the gNB may include a centralized unit CU and a DU. The gNB may further include an active antenna unit (active antenna unit, AAU). The CU implements some functions of the gNB, and the DU implements some functions of the gNB. For example, the CU is responsible for processing a non-real-time protocol and service, and implementing functions of a radio resource control (radio resource control, RRC) layer and a packet data convergence protocol (packet data convergence protocol, PDCP) layer. The DU is responsible for processing a physical layer protocol and a real-time service, and implementing functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (radio access network, RAN), or may be classified as a network device in a core network (core network, CN). This is not limited in this application.

In embodiments of this application, the terminal or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, contacts, word processing software, and instant messaging software. In addition, embodiments of this application impose no special limitation on a specific structure of an execution body of a method provided in embodiments of this application, provided that the execution body can run a program that records code of the method provided in embodiments of this application to perform communication by using the method provided in embodiments of this application. For example, the execution body of the method provided in embodiments of this application may be the terminal or the network device, or may be a function module that is in the terminal or the network device and that can invoke and execute a program.

In addition, aspects or features of this application may be implemented as a method, an apparatus, or a product that uses standard programming and/or engineering technologies. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

It may be understood that the network device and the terminal may be deployed on land, including indoor or outdoor, handheld, or in-vehicle; or may be deployed on water; or may be deployed on an airplane, a balloon, or a satellite in the air. Application scenarios of a radio access network device and the terminal are not limited in embodiments of this application.

The following briefly describes terms used in this application.

1. Authorized Resource:

The authorized resource is usually a resource that can provide relatively high communication quality. The authorized resource is usually a time-frequency resource that can be used only after being approved by a national or local radio committee. Different systems such as an LTE system and a Wi-Fi system, or systems used by different operators cannot share a licensed time-frequency resource.

2. Unauthorized Resource:

The unlicensed resource may perform offloading for a licensed resource, to obtain better coverage and capacity, and improve user experience. Specifically, the unlicensed resource may be a resource that can be shared by a plurality of communications devices. Sharing of the unlicensed resource means that limitations are posed only on indicators such as transmit power and out-of-band emission for use of a particular frequency spectrum, to ensure that a plurality of devices sharing the frequency band meet a basic coexistence requirement. An operator can implement network capacity offloading by using an unlicensed resource, but needs to comply with regulatory requirements of different regions and different frequency spectrums on the unlicensed resource. These requirements are usually posed to protect a public system such as radar and to ensure that a plurality of systems fairly coexist and cause no negative impact to each other. These requirements include a transmit power limit, an out-of-band leakage indicator, and indoor and outdoor use restrictions. In addition, some regions further have some additional coexistence policies and the like. For example, the communications devices can use a time-frequency resource in a contention manner or a listening manner, for example, a listen before talk (listen before talk, LBT) manner.

As an example instead of a limitation, in embodiments of the present invention, the unlicensed resource (specifically, the unlicensed resource) may include a frequency band near 5 GHz, a frequency band near 2.4 GHz, a frequency band near 3.5 GHz, and a frequency band near 6 GHz.

In addition, as an example instead of a limitation, in embodiments of the present invention, the communications system may use, for example, a licensed-assisted access (licensed-assisted access, LAA) technology, a dual connectivity (dual connectivity, DC) technology, or an unlicensed-assisted access (standalone) technology. LAA is a technology of configuring carriers (unlicensed carriers) on a plurality of unlicensed resources and using licensed carriers as assistance to perform communication through the unlicensed carriers based on a configuration and a structure of carrier aggregation (carrier aggregation, CA) in an existing LTE system and based on communication performed by using carriers (licensed carriers) configured on a licensed frequency band of an operator. In other words, an LTE device may use a licensed carrier as a primary component carrier (primary component carrier, PCC) or a primary cell (primary cell, PCell) through CA, and use an unlicensed carrier as a secondary component carrier (secondary component carrier, SCC) or a secondary cell (secondary cell, SCell). The dual connectivity DC technology includes a technology of jointly using a licensed carrier and an unlicensed carrier through non-CA, or includes a technology of jointly using a plurality of unlicensed carriers through non-CA. Alternatively, an LTE device may be directly deployed on an unlicensed carrier through independent deployment.

3. eMBB Service:

The eMBB service is mainly characterized by a large amount of transmitted data and a relatively high transmission rate. Typical eMBB services mainly include an ultra-high-definition video, augmented reality (augmented reality, AR), virtual reality (virtual reality, VR), and the like.

4. URLLC Service:

The URLLC service is mainly characterized by ultra-high reliability, a low latency, a relatively small amount of transmitted data, and burstiness. For example, when reliability is not considered, a latency of the URLLC service needs to fall within 0.5 milliseconds (millisecond, ms), and when reliability of 99.999% is achieved, a transmission latency needs to fall within 1 ms. Typical URLLC services include tactile interactive applications such as wireless control in an industrial manufacturing or production process, motion control and remote repair of an unmanned vehicle or an unmanned aircraft, and remote surgery.

5. Bandwidth (Bandwidth):

The bandwidth may be understood as a segment of contiguous or non-contiguous resources in frequency domain. For example, the bandwidth may be a cell (cell), a carrier, or a bandwidth part. The cell may be a serving cell of a terminal. The serving cell is described from a perspective of resource management, mobility management, or a service unit at a higher layer. A coverage area of each network device may be divided into one or more serving cells, and the serving cell may be considered to include a specific frequency domain resource. In other words, one serving cell may include one or more carriers. The concept of the carrier is described from a perspective of signal generation at a physical layer. One carrier is defined by one or more frequencies, corresponds to a segment of contiguous or noncontiguous frequency spectra, and is used to carry communication data between the network device and the terminal. A downlink carrier may be used for downlink transmission, and an uplink carrier may be used for uplink transmission. In addition, one carrier may include one or more bandwidth parts.

It should be noted that if one cell includes one carrier, one carrier may be considered as one independent cell without considering a physical location. In other words, the carrier and the cell may be equivalently replaced with each other.

It should be understood that the bandwidth part (bandwidth part, BWP) may be referred to as a carrier bandwidth part (carrier bandwidth part), a subband (subband) bandwidth, a narrowband (narrowband) bandwidth, or the like. For ease of description, the BWP is used as an example for description in the following embodiments. However, this is not limited in this application.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to provide a communications service for the terminal and enables the terminal to access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink communication with the network device 70. For example, the network device 70 may send a downlink signal to the terminal 10, the terminal 20, the terminal 30, the terminal 40, and the terminal 60, or may receive an uplink signal sent by the terminal 10, the terminal 20, the terminal 30, the terminal 40, and the terminal 60.

In addition, the terminal 40, the terminal 50, and the terminal 60 may also be considered as a communications system. The terminal 60 may send a signal to the terminal 40 and the terminal 50, or may receive a signal sent by the terminal 40 and the terminal 50. In other words, embodiments of this application may be applied to downlink signal transmission, or may be applied to uplink signal transmission, or may be applied to device-to-device (device to device, D2D) signal transmission. For downlink signal transmission, a sending device is a network device, and a corresponding receiving device is a terminal. For uplink signal transmission, a sending device is a terminal, and a corresponding receiving device is a network device. For D2D signal transmission, a sending device is a terminal, and a corresponding receiving device is also a terminal. A signal transmission direction is not limited in embodiments of this application.

It should be noted that embodiments of this application may be applied to a communications system including one or more network devices, or may be applied to a communications system including one or more terminals. This is not limited in this application. One network device may send data or control signaling to one or more terminals. Alternatively, a plurality of network devices may simultaneously send data or control signaling to one or more terminals.

Figure 2:
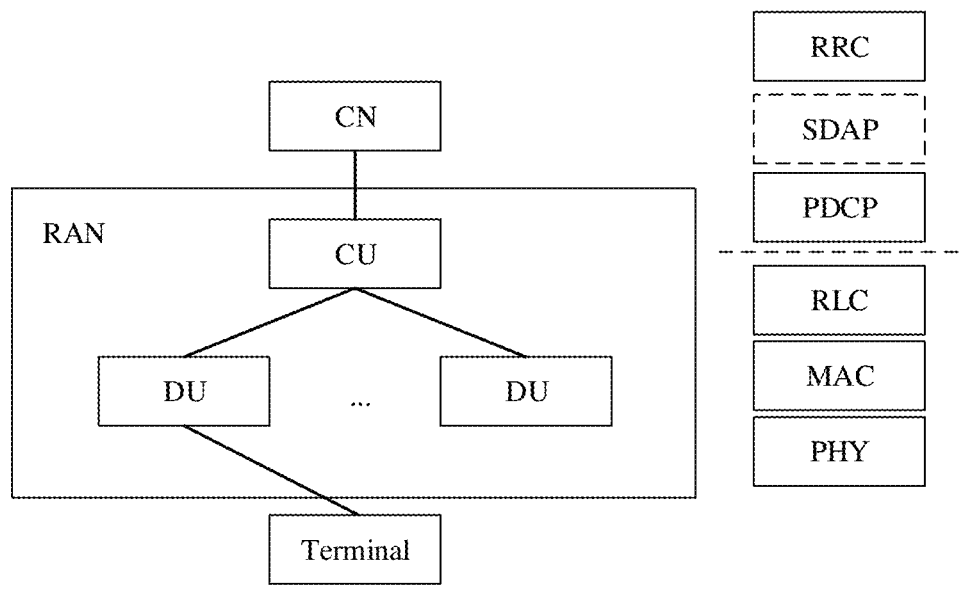
FIG. 2 is a schematic diagram of a specific communications architecture according to this application.

FIG. 2 is a schematic diagram of a network architecture according to an embodiment of this application. The network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, a RAN device (eNB) includes a baseband apparatus and a radio frequency apparatus. The radio frequency apparatus may be remotely disposed relative to the baseband apparatus. For example, a remote radio unit (remote radio unit, RRU) is remotely disposed relative to a BBU. Communication between the RAN device and the terminal complies with a specific protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In implementation, a service data adaptation (service data adaptation protocol, SDAP) layer is further included above the PDCP layer.

The functions of these protocol layers may be implemented by one node, or may be implemented by a plurality of nodes. For example, in an evolved structure, a RAN device may include a centralized unit (centralized unit, CU) and a distributed unit (distributed unit, DU). A plurality of DUs may be centrally controlled by one CU. As shown in FIG. 2, a CU and a DU may be divided based on a protocol layer of a wireless network. For example, functions of both the PDCP layer and a layer above the PDCP layer are set on the CU, and functions of protocol layers below the PDCP layer, such as the RLC layer and the MAC layer, are set on the DU.

Such division based on the protocol layers is merely an example. The division may alternatively be performed at another protocol layer, such as the RLC layer. Functions of both the RLC layer and a protocol layer above the RLC layer are set on the CU, and a function of a protocol layer below the RLC layer is set on the DU. Alternatively, the division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner. For example, the division is performed based on a delay. A function whose processing time needs to meet a delay requirement is set on the DU, and a function whose processing time does not need to meet the delay requirement is set on the CU.

In addition, the radio frequency apparatus may not be placed in the DU but is placed remotely from the DU, or may be integrated into the DU, or a part is placed remotely from the DU and a remaining part is integrated into the DU. This is not limited herein.

Figure 3:
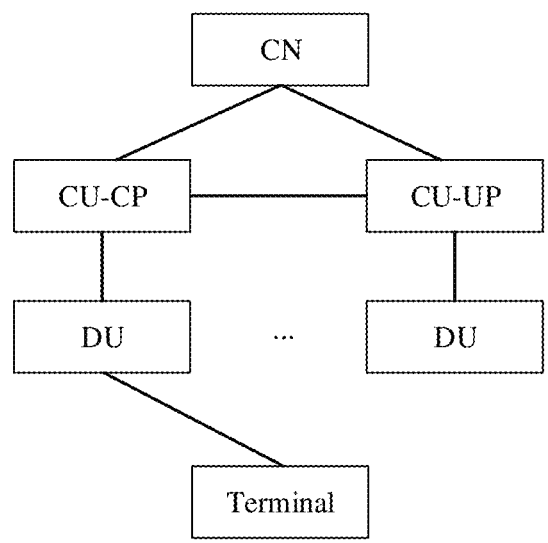
FIG. 3 is a schematic diagram of another specific communications architecture according to this application.

Further refer to FIG. 3. Compared with the architecture shown in FIG. 2, in an architecture in FIG. 3, a control plane (CP) and a user plane (UP) of a CU may be separated and implemented by using different entities, which are respectively a control plane CU entity (CU-CP entity) and a user plane CU entity (CU-UP entity).

In the foregoing network architecture, signaling generated by the CU may be sent to a terminal through the DU, or signaling generated by a terminal may be sent to the CU through the DU. The DU may transparently transmit the signaling to the terminal or the CU by directly encapsulating the signaling at a protocol layer without parsing the signaling. In the following embodiments, if transmission of such signaling between the DU and the terminal is involved, sending or receiving of the signaling by the DU includes this scenario. For example, signaling at an RRC layer or a PDCP layer is finally processed as signaling at a PHY layer and sent to the terminal, or is converted from received signaling at a PHY layer. In this architecture, it may also be considered that the signaling at the RRC layer or the PDCP layer is sent by the DU, or sent by the DU and a radio frequency.

In the foregoing embodiments, the CU is classified as a network device on a RAN side. In addition, the CU may alternatively be classified as a network device on a CN side. This is not limited herein.

An apparatus in the following embodiments of this application may be located in a terminal or a network device based on a function implemented by the apparatus. When the foregoing CU-DU structure is used, a network device may be a CU node, a DU node, or a RAN device including a CU node and a DU node.

A network device restricts a service sent by a terminal in uplink. To be specific, the network device may determine, based on a logical channel corresponding to the service, whether to allow the service to be transmitted by using an LAA SCell, to configure "cell usage restriction information". If the network device allows the service to be transmitted by using the LAA SCell, an LAA-UL-allowed information element configured by the network device is set to "TRUE". Correspondingly, the terminal determines, based on the LAA-UL-allowed information element, that the corresponding service can be sent by using the LAA SCell. If the network device does not allow the service to be transmitted by using the LAA SCell, the LAA-UL-allowed information element configured by the network device is set to "FALSE". Correspondingly, the terminal determines, based on the LAA-UL-allowed information element, that the corresponding service cannot be sent by using the LAA SCell. For example, the terminal can send the service by using only a licensed cell (licensed cell).

Figure 4:
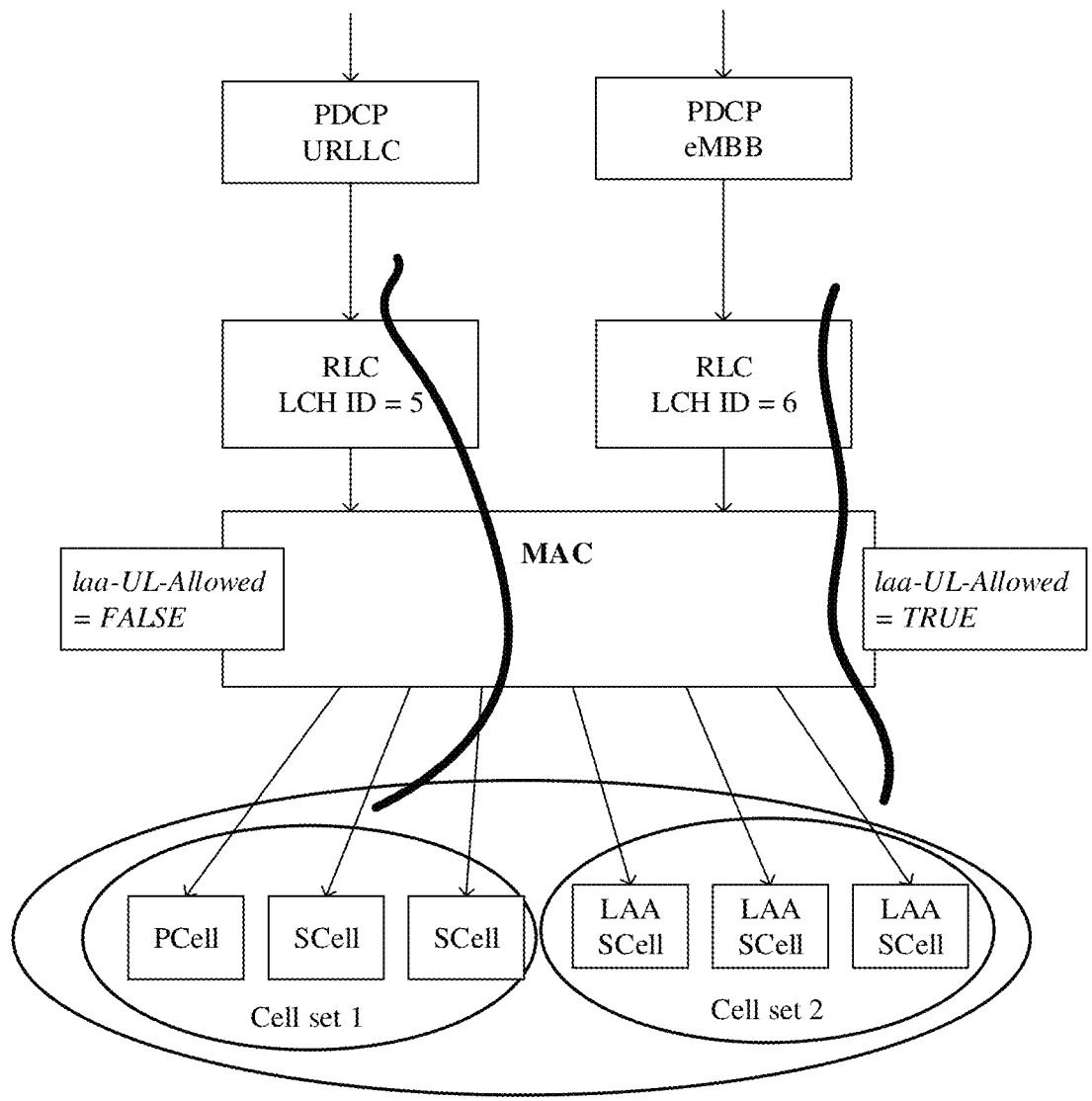
FIG. 4 is a schematic diagram of a signal transmission method in the conventional solution.

Because the URLLC service requires low-latency transmission, the network device sets the LAA-UL-allowed information element to "FALSE" for the URLLC service, and sets the LAA-UL-allowed information element to "TRUE" for an eMBB service, so that the URLLC service is sent by using only a licensed cell, and the eMBB service is sent by using only an LAA SCell. In this way, "hard isolation" of transmission resources for the URLLC service and the eMBB service is implemented. For example, as shown in FIG. 4, the eMBB service can be sent by using only a cell set 2, and the URLLC service can be sent by using only a cell set 1.

However, transmission of the URLLC service is not continuous, causing a waste of licensed cell resources. In other words, frequency spectrum utilization and a throughput of a system are relatively low.

Figure 5:
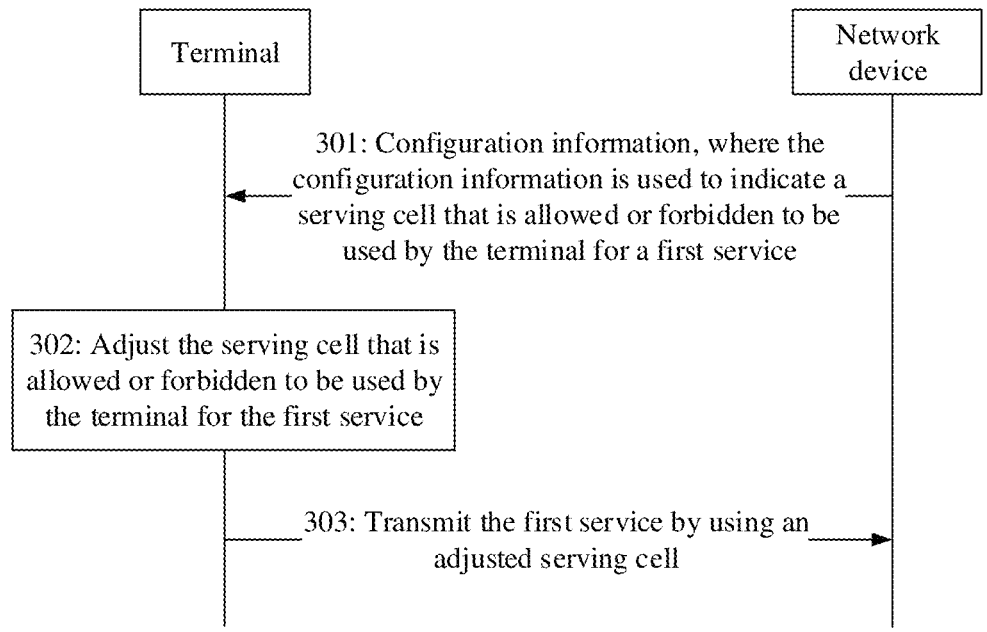
FIG. 5 is a schematic flowchart of a signal transmission method according to an embodiment of this application.

FIG. 5 is a schematic flowchart of a signal transmission method according to an embodiment of this application.

It may be understood that a signal in this embodiment of this application may be a service, or may be control information. For ease of description, a service is used as an example for description in the following embodiments, but this application is not limited thereto. In other words, in the following embodiments, the service may be replaced with control information. For example, a first service may be replaced with first control information, and a second service may be replaced with second control information.

Optionally, the first service or the second service may include data transmitted on a data radio bearer (data radio bearer, DRB), data transmitted on a logical channel, data transmitted by using a service flow (flow), or data transmitted by using a protocol data unit (protocol data unit, PDU) session.

Optionally, the first control information or the second control information may include at least one of signaling radio bearer (signaling radio bearer, SRB) bearer signaling, common control channel (common control channel, CCCH) bearer signaling, service data adaptation protocol (service data adaptation protocol, SDAP) signaling (for example, an SDAP layer control PDU (control PDU) or SDAP layer control information), packet data convergence protocol (packet data convergence protocol, PDCP) signaling (for example, a PDCP layer control PDU (PDCP control PDU) or PDCP layer control information), radio link control RLC signaling (for example, an RLC layer control PDU (RLC control PDU) or RLC layer control information), and media access control (media access control, MAC) signaling (for example, a MAC CE or MAC layer control information).

Specifically, the SRB may be an SRB 1, an SRB 2, or an SRB 3. The SRB may be used to send RRC signaling, or used to send a PDCP data PDU corresponding to the SRB. The CCCH is used to send specific RRC signaling transmitted on the CCCH. The SDAP control PDU or the SDAP layer control information, for example, is used to indicate that a terminal has stopped mapping a QoS flow indicated by the control PDU to a DRB transmitted by using the control PDU. The PDCP control PDU or the PDCP layer control information may be a PDCP layer status report or the like. The RLC control PDU or the RLC layer control information may be an RLC layer status PDU, and is used to feed back an RLC data receiving status of a receive end. The MAC CE or the MAC layer control information may be a MAC CE such as an information buffer report or a power headroom report.

301: The terminal receives configuration information from a network device, where the configuration information is used to indicate a serving cell that is allowed or forbidden to be used by the terminal for the first service. Correspondingly, the network device sends the configuration information to the terminal.

Specifically, the network device may pre-configure, for the first service, a serving cell that is allowed to be used or a serving cell that is forbidden to be used by the terminal to transmit the first service.

It may be understood that the first service may be services of a same type. For example, the first service is an eMBB service or a massive machine type communication (massive machine type communications, mMTC) service.

It may be further understood that the serving cell that is allowed to be used by the terminal for the first service may be only a serving cell that is allowed to be used, and another serving cell cannot be used. Alternatively, the serving cell that is allowed to be used by the terminal for the first service may be a cell other than a cell that is allowed to be used, and another serving cell cannot be used.

It may be further understood that the configuration information may be carried in an RRC message, for example, any one of an RRC reconfiguration message, an RRC resume message, an RRC setup message, or an RRC release message.

It may be further understood that the configuration information may be sent by a core network to the network device, for example, a message applicable to an NG interface between the network device and the core network, such as a protocol data unit (protocol data unit, PDU) session resource setup (PDU session resource setup) message or a PDU session resource modification (PDU session resource modification) message. A specific NG message is not limited herein. Then, the network device sends the configuration information to the terminal by using an air interface message.

It may be further understood that the serving cell that is allowed or forbidden to be used by the terminal for the first service may be described as a restriction manner for the serving cell for the first service in the following embodiment.

Optionally, the serving cell that is allowed or forbidden to be used by the terminal for the first service may be in a form of a single cell, a cell set, or a cell type.

For example, the terminal is forbidden to transmit the first service by using a serving cell 1 and a serving cell 3, or the terminal is allowed to transmit the first service by using a serving cell 2.

For another example, the first service is allowed to be transmitted by using a serving cell corresponding to a cell identifier included in a cell list 1, or the first service is forbidden to be transmitted by using serving cells corresponding to cell identifiers included in a cell list 2 and a cell list 3.

For another example, the first service is allowed to be transmitted by using an unlicensed cell, and the first service is forbidden to be transmitted by using a licensed cell.

It may be understood that the cell list may be classified based on a cell type. For example, a cell list may correspond to a licensed cell type or an unlicensed cell type.

Optionally, the configuration information may indicate a plurality of lists of serving cells that are allowed or forbidden to be used by the terminal for the first service. For example, the configuration information may include a plurality of information elements, and each of the plurality of information elements is used to indicate one list of serving cells that are allowed or forbidden to be used by the terminal for the first service.

Specifically, in step 301, a plurality of types of serving cell lists of restricted serving cells, that is, a plurality of types of restriction manners, may be directly configured for the first service. Specifically, the configuration information includes a plurality of information elements, and each information element includes one type of restriction manner. In this case, the terminal may learn of a plurality of restriction manners based on the configuration information, and subsequently, the terminal may flexibly select a proper restriction manner from the plurality of restriction manners to restrict the serving cell. In this way, system performance is further improved.

For example, the configuration information includes a plurality of cell lists. The cell list 1 is {serving cell #1, serving cell #2}, and the cell list 2 is {serving cell #3, serving cell #4}. A current restriction manner for the terminal for the first service may be that a cell indicated by the cell list 1 is allowed to be used, and an adjusted restriction manner for the first service may be that a cell indicated by the cell list 2 is allowed to be used. Alternatively, a current restriction manner for the terminal for the first service may be that a cell indicated by the cell list 1 is forbidden to be used, and an adjusted restriction manner for the first service may be that a cell indicated by the cell list 2 is forbidden to be used.

It may be understood that the cell list may include one or more cell identifiers.

It may be understood that the cell list may include cell identifiers of serving cells, and the cell identifiers may be used to identify cells, that is, used to distinguish among different cells.

302: The terminal adjusts the serving cell that is allowed or forbidden to be used by the terminal for the first service.

Specifically, the terminal may flexibly adjust the serving cell that is allowed or forbidden to be used by the terminal to transmit the first service.

It may be understood that, if the configuration information in step 301 is used to configure the plurality of types of restriction manners, a restriction manner for an adjusted serving cell for the first service is one of the plurality of types of restriction manners. More specifically, if the configuration information includes a list of serving cells that are allowed to be used by the terminal for the first service, a first serving cell adjusted for the first service is a serving cell in the list of serving cells.

It may be further understood that the terminal may adjust a restriction on the serving cell for the first service by changing, activating, or deactivating the serving cell. This is not limited in this application.

In an embodiment, the terminal may dynamically adjust the serving cell for the first service.

In a possible implementation, when detecting that the second service arrives, the terminal adjusts the serving cell that is allowed or forbidden to be used by the terminal for the first service.

Specifically, when detecting that a new service arrives, the terminal may adjust the serving cell that is allowed or forbidden to be used for the first service that is currently being processed. In this way, a capability of the terminal to simultaneously process a plurality of services is improved.

For example, in step 301, the network device configures that the first service is allowed to be transmitted by using a licensed cell. If the terminal detects that the second service arrives, the terminal adjusts the serving cell, so that the first service is allowed to be transmitted by using an unlicensed cell or by using only an unlicensed cell.

It may be understood that the arrival of the second service may be that there is the to-be-transmitted or to-be-processed second service. This is not limited in this application.

Optionally, the second service is a service whose transmission delay requirement is less than or equal to a preset delay threshold, and the first service is a service whose transmission delay requirement is greater than the preset delay threshold. In other words, if the second service having a higher transmission delay requirement arrives, the terminal may adjust the serving cell for the first service having a lower transmission delay requirement, so that the second service is preferably sent. In this way, quality of service (quality of service, QoS) and transmission efficiency of the second service having the higher delay requirement are ensured.

Optionally, the second service is a service transmitted by using a radio resource scrambled with a specific radio network temporary identifier (radio network temporary identifier, RNTI), or a service transmitted by using a radio resource indicated in a specific downlink control information (downlink control information, DCI) format or by a specific field in DCI, or a service transmitted by using a radio resource indicated by a PDCCH transmitted by using a specific control resource set (control resource set, CORE-SET), or may be a service transmitted by using a radio resource indicated by a PDCCH transmitted in specific search space (search space). It should be noted that the RNTI, the DCI format, the specific field in the DCI, the CORESET, or the search space is different from an RNTI, a DCI format, a specific field in DCI, a CORESET, or search space corresponding to the first service.

Optionally, the second service is a service transmitted on a specific logical channel or logical channel group indicated by a network.

For example, if the network indicates a logical channel K or a logical channel group M corresponding to the second service, a service of the logical channel K or the logical channel group M is the second service.

Optionally, a priority of the second service is higher than a priority of the first service, or a priority of the second service is higher than a preset priority level.

For example, when data from a logical channel or logical channel group with a higher priority arrives, or when data from a logical channel or logical channel group with a priority higher than a preset priority threshold arrives, in other words, when a high-priority service arrives, the terminal may adjust a serving cell for a low-priority service, so that more serving cells can serve the high-priority service. In this way, transmission efficiency of the high-priority service is improved.

It should be noted that a priority of control information may be determined in the following two manners:

Manner 1:

A priority of a logical channel associated with the control information: For example, CCCH signaling is used as an example, a priority of the CCCH signaling is a priority corresponding to an associated logical channel. MAC CE signaling is still used as an example. A priority of the MAC CE is a relative priority designated by a logical channel corresponding to uplink logical channel prioritization (logical channel prioritization, LCP) or an absolute priority configured by a network side.

Manner 2:

An absolute priority or a relative priority of the control information that is configured or preset (for example, specified in a protocol) by a network side: For example, the protocol specifies that a priority of the SDAP control PDU is relatively high, or specifies the SDAP control PDU as high-priority signaling.

In another possible implementation, the terminal may adjust, based on a current channel state, the serving cell that is allowed or forbidden to be used by the terminal for the first service.

Specifically, the terminal may further consider the current channel state, and adjust the serving cell that is allowed or forbidden to be used by the terminal for the first service. In other words, the terminal may adjust, more properly with reference to the current channel state, the serving cell that is allowed or forbidden to be used by the terminal for the first service. In this way, overall communication performance is further improved.

For example, if the current channel state is idle, the terminal may restrict a small quantity of serving cells for the first service. If the current channel state is busy, the terminal may restrict a large quantity of serving cells for the first service, to ensure transmission of the second service.

For example, the terminal may specifically adjust, when a channel state of the unlicensed cell is greater than or equal to a preset threshold, the serving cell, so that the licensed cell is allowed to be used by the terminal for the first service. In other words, when determining that the unlicensed cell can also ensure communication quality of the first service, the terminal may provide the licensed cell for a service with a higher priority. In this way, overall communication efficiency and communication quality are improved.

For example, in step 301, if the network device configures, through the configuration information, a fact that the first service is allowed to be transmitted by using the licensed cell or by using only the licensed cell, and if the current channel state of the unlicensed cell is good, the terminal adjusts the serving cell, so that the first service is allowed to be transmitted by using the unlicensed cell or by using only the unlicensed cell.

In another possible implementation, the terminal may adjust, based on current load, the serving cell that is allowed or forbidden to be used for the first service.

Specifically, the terminal may flexibly adjust, based on the current load, the serving cell that is allowed or forbidden to be used for the first service. In this way, a throughput of a system is improved.

For example, when the current load of the terminal is greater than or equal to a preset threshold, the terminal adjusts the serving cell, so that the unlicensed cell is allowed to be used by the terminal for the first service. In other words, if the current load is relatively high, the terminal adjusts the serving cell, so that the first service occupies some unlicensed cells, to avoid congestion caused because the first service with a lower priority occupies a licensed cell when the load is relatively high. In this way, a throughput of a system is ensured.

In another embodiment, the terminal may receive indication information from the network device, where the indication information is used to indicate the serving cell that is allowed or forbidden to be used for the first service; and determine, based on the indication information, the serving cell that is allowed or forbidden to be used by the terminal for the first service.

Specifically, the network device may determine the serving cell that can be used for the first service, and notify the terminal of the serving cell by using the indication information, so that the terminal can adjust the serving cell for the first service based on the indication information. In this way, power consumption overheads of the terminal are reduced.

It may be understood that a scenario in which the network device determines a restriction manner for the serving cell for the first service may be the same as a scenario in which the terminal determines a restriction manner for the serving cell for the first service. To avoid repetition, details are not described herein.

It should be noted that, when the network device detects that the second service arrives at another terminal, the network device may restrict the serving cell for the first service of the foregoing terminal.

It may be further understood that the indication information may be carried in a MAC layer message, for example, a MAC CE. Alternatively, the indication information may be carried in physical layer signaling, for example, PDCCH signaling.

Optionally, the indication information may specifically include a serving cell identifier, a cell list identifier, or a cell type identifier, and a cell list corresponding to the cell list identifier includes at least one serving cell identifier.

Specifically, the network device may adjust, based on the indication information, the serving cell that can be used for the first service, where the serving cell may be in a form of a serving cell, a cell set (that is, in a form of a cell list), or a cell type. The network device may flexibly select, based on an adjustment manner, specific content included in the indication information, and may use a cell list manner or a cell type manner when large-granularity adjustment is to be performed. In this way, relatively large signaling overheads caused by indication of a single serving cell are avoided. Alternatively, when small-granularity adjustment is to be performed, the network device may use a serving cell identifier manner. In this way, adjustment can be performed more precisely, and adjustment precision is improved.

Optionally, in an embodiment, step 302 may be specifically implemented at a packet data convergence protocol (packet data convergence protocol, PDCP) layer.

In an implementation, after a PDCP entity adjusts the serving cell that is allowed or forbidden to be used by the terminal for the first service, the terminal sends the first service to a target RLC entity in at least two RLC entities associated with the PDCP entity. If the second service exists, the terminal sends the second service to another RLC in the at least two RLC entities. After the serving cell for the first service is adjusted, service offloading processing is performed, so that interference between different services can be avoided. Because the first service and the second service are processed by different RLC entities, processing efficiency of the first service and the second service can also be improved.

Figure 6:
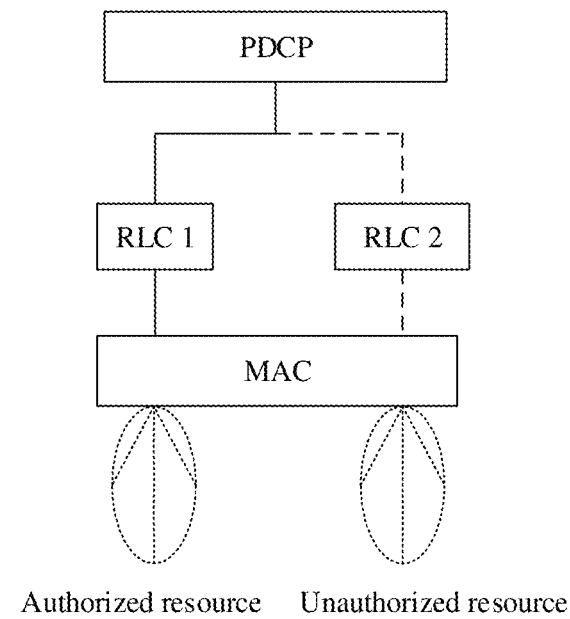
FIG. 6 is a schematic diagram of a signal transmission method according to a specific embodiment of this application.

For example, as shown in FIG. 6, the terminal adjusts the serving cell for the first service at the PDCP layer, sends the first service to an RLC entity 2, and sends the second service to an RLC entity 1.

It may be understood that one PDCP entity may be associated with two or more RLC entities. Modes of the two or more RLC entities may be the same or may be different. This is not limited in this application. The modes of the RLC entities may include an acknowledged mode (acknowledged mode, AM), an unacknowledged mode (unacknowledged mode, UM), and a transparent mode (transparent mode, TM). The AM supports an automatic repeat request (automatic repeat request, ARQ) at the RLC layer and a segmentation function. The UM does not support an ARQ at the RLC layer, but can support a segmentation function. The TM does not change any data, but only performs transparent transmission processing.

It may be further understood that a specific RLC mode used to process the first service and a specific RLC mode used to process the second service may be preconfigured by the network device.

Optionally, the first service and the second service may use a same RLC mode, for example, an RLC AM or an RLC UM.

Optionally, the first service and the second service may use different RLC modes. For example, the first service uses the RLC UM, and the second service uses the RLC AM.

It may be further understood that the RLC entity may be configured by the network device by using an air interface message, for example, an RRC reconfiguration message, an RRC resume message, an RRC setup message, or an RRC release message, or may be configured by using another message. This is not limited in this application.

In another implementation, after a PDCP entity adjusts the serving cell that is allowed or forbidden to be used by the terminal for the first service, the terminal sends the first service to a long term evolution-wireless local area network aggregation (long-term evolution-wireless local network aggregation, LWA) adaptation protocol (LWA adaptation protocol, LWAAP) entity associated with the PDCP entity. If the second service exists, the terminal sends the second service to an RLC entity associated with the PDCP entity. After the serving cell for the first service is adjusted, service offloading processing is performed, so that interference between different services can be avoided. In addition, a throughput for the first service can be ensured while QoS of the second service is ensured.

Figure 7:
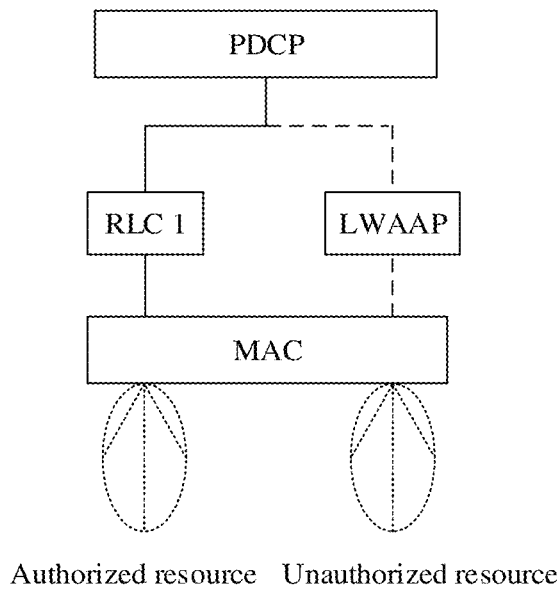
FIG. 7 is a schematic diagram of a signal transmission method according to another specific embodiment of this application.

For example, as shown in FIG. 7, the terminal adjusts the serving cell for the first service at the PDCP layer, sends the first service to an LWAAP entity, and sends the second service to an RLC entity.

It may be understood that one PDCP entity may be associated with at least one RCL entity and one LWAAP entity. The RCL entity and the LWAAP entity may be configured by the network device by using an air interface message, for example, an RRC reconfiguration message, an RRC resume message, an RRC setup message, or an RRC release message, or may be configured by using another message. This is not limited in this application. In addition, the network device may configure a corresponding secondary leg (secondary leg) for the RLC entity or the LWAAP entity.

It may be understood that the PDCP entity may be understood as an execution body of the terminal at the PDCP layer. Similarly, the RLC entity may also be understood as an execution body of the terminal at the RLC layer. The LWAAP entity is also an execution body of the terminal at the RLC layer.

Optionally, in another embodiment, step 302 may be specifically implemented at a media access control (media access control, MAC) layer.

Figure 8:
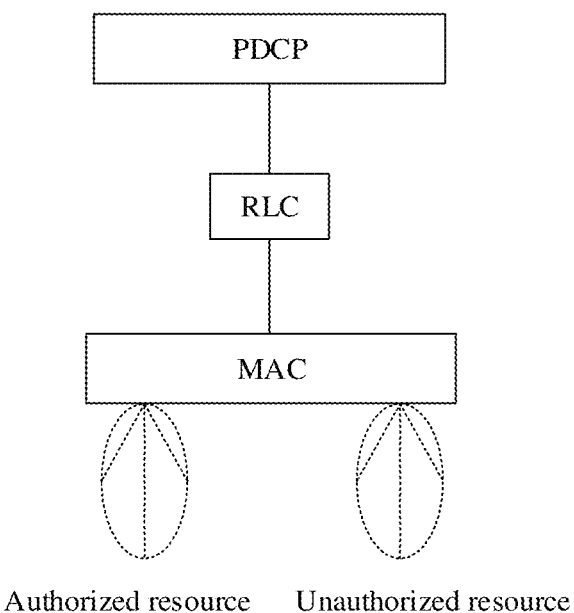
FIG. 8 is a schematic diagram of a signal transmission method according to another specific embodiment of this application.

Specifically, the terminal may adjust, at the MAC layer, the serving cell that is allowed or forbidden to be used by the terminal for the first service. For example, as shown in FIG. 8, after adjusting the serving cell for the first service, the terminal transmits the first service by using an unlicensed cell, and transmits the second service by using a licensed cell.

303: The terminal transmits the first service by using the adjusted serving cell.

Specifically, after receiving the configuration information that is used to indicate the serving cell that is allowed or forbidden to be used for the first service, the terminal may dynamically and flexibly adjust the serving cell for the first service, and transmit the first service by using the adjusted serving cell. In this way, compared with the conventional solution in which hard isolation is used and services of a same type can be sent by using only a fixed serving cell, this embodiment of this application can improve frequency spectrum utilization and a throughput of a system.

When the adjusted serving cell is a serving cell that is allowed to be used by the terminal, the terminal transmits the first service by using the adjusted serving cell. When the adjusted serving cell is a serving cell that is forbidden to be used by the terminal, the terminal transmits the first service by using a serving cell that is not forbidden.

It may be understood that the first service may be a data packet, and the data packet may be a PDCP PDU, a PDCP SDU, an LC PDU, an RLC SDU, or the like. This is not limited in this application.

Optionally, in an embodiment, in steps 301 to 303, the serving cell is directly adjusted at a granularity of a service. In this application, the serving cell may alternatively be adjusted at a granularity of a logical channel, a terminal, a MAC entity, a PDU session, or a QoS flow. To be specific, the service in the embodiment shown in FIG. 5 is replaced with the logical channel, the terminal, the MAC entity, the PDU session, or the QoS flow. To avoid repetition, details are not described herein. However, this application is not limited thereto.

For example, the network device may configure, for the terminal, a serving cell that is allowed or forbidden to be used by the UE #1. The terminal may flexibly adjust the serving cell that is allowed or forbidden to be used by the UE #1, and transmit a signal by using an adjusted serving cell. In this way, frequency spectrum utilization of a system is improved.

Similarly, the network device may also configure, for the terminal, a serving cell that is allowed or forbidden to be used for a MAC entity #1, a PDU session #1, or a QoS flow #1. The terminal may flexibly adjust the serving cell that is allowed or forbidden to be used by the MAC entity #1, the PDU session #1, or the QoS flow #1, and transmit a signal by using an adjusted serving cell. In this way, frequency spectrum utilization of the system is improved.

Optionally, the common logical channel, the terminal, the MAC entity, the PDU session, and the QoS flow may each have a mapping relationship with a service. The terminal implements a restriction on the serving cell for the first service by controlling the common logical channel, the terminal, the MAC entity, the PDU session, and the QoS flow.

Embodiments described in this specification may be independent solutions, or may be combined based on internal logic. These solutions all fall within the protection scope of this application.

Optionally, in an embodiment, in a signal transmission method in another embodiment of this application, the network device or the terminal may restrict the first service or the first control information in a form of a bandwidth part (bandwidth part, BWP). The BWP is a segment of continuous or discrete bandwidth resources configured by a network side for the terminal, to implement flexible transmission bandwidth configuration on the network side and the terminal side. The network side may configure one or more BWPs for the terminal, and different BWPs may be flexibly switched. In a same serving cell, the terminal may use one or more active BWPs. Alternatively, the network device or the terminal may restrict the first service or the first control information in a form of another larger resource or a smaller resource. For example, the configuration information received by the terminal from the network device may be used to indicate a BWP that is allowed or forbidden to be used by the terminal for the first service. The terminal adjusts the BWP that is allowed or forbidden to be used by the terminal for the first service, and transmits the first service by using an adjusted BWP.

It may be understood that in the foregoing method embodiments, a method and an operation that are implemented by the terminal may be implemented by a component (for example, a chip or a circuit) that can be used in the terminal, and a method and an operation that are implemented by the network device may be implemented by a component (for example, a chip or a circuit) that can be used in the network device.

The foregoing mainly describes the solutions provided in embodiments of this application from a perspective of interaction. It may be understood that, to implement the foregoing functions, each network element such as the terminal or the network device includes a corresponding hardware structure and/or software module for performing each function. A person skilled in the art may be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the terminal or the network device may be divided based on the foregoing method examples. For example, each functional module may be divided to correspond to each function, or two or more functions may be integrated into one processing module. The integrated module may be implemented in a form of hardware, or may be implemented in a form of a software functional module. It should be noted that in embodiments of this application, division into the modules is an example and is merely logical function division, and may be other division in an actual implementation. An example in which each functional module is obtained through division based on a corresponding function is used below for description.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

The methods provided in embodiments of this application are described above in detail with reference to FIG. 5 to FIG. 8. Apparatuses provided in embodiments of this application are described below in detail with reference to FIG. 9 to FIG. 16. It should be understood that descriptions of the apparatus embodiments correspond to the descriptions of the method embodiments. Therefore, for content not described in detail, refer to the foregoing method embodiments. For brevity, details are not described herein again.

Figure 9:
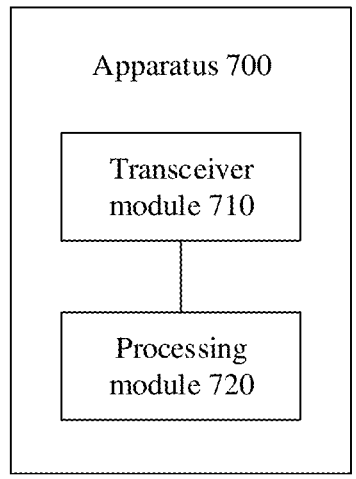
FIG. 9 is a schematic block diagram of a signal transmission apparatus according to an embodiment of this application.

FIG. 9 is a schematic block diagram of a data processing apparatus 700 according to an embodiment of this application.

It should be understood that the apparatus 700 may correspond to each terminal or the chip in the terminal shown in FIG. 1, and the terminal or the chip in the terminal in the embodiment shown in FIG. 1, and may have any function of the terminal in the method embodiment shown in FIG. 1. The apparatus 700 includes a transceiver module 710 and a processing module 720.

The transceiver module 710 is configured to receive configuration information from a network device, where the configuration information is used to indicate a serving cell that is allowed or forbidden to be used by the terminal for a first service or first control information.

The processing module 720 is configured to adjust the serving cell that is allowed or forbidden to be used by the terminal for the first service or the first control information.

The transceiver module 710 is configured to transmit the first service or the first control information by using an adjusted serving cell.

Optionally, the processing module 720 is specifically configured to:
  when a second service or second control information arrives, adjust the serving cell that is allowed or forbidden to be used by the terminal for the first service or the first control information.

Optionally, the second service or the second control information is a service or control information whose transmission delay requirement is less than or equal to a preset delay threshold, and the first service or the first control information is a service or control information whose transmission delay requirement is greater than the preset delay threshold; or a priority of the second service or the second control information is higher than a priority of the first service or the first control information; or a priority level of the second service or the second control information is higher than a preset priority level.

Optionally, the processing module 720 is specifically configured to:
  adjust, based on a current channel state, the serving cell that is allowed or forbidden to be used by the terminal for the first service or the first control information, where the channel state is a state of a channel corresponding to an unlicensed cell and/or a state of a channel corresponding to a licensed cell.

Optionally, the processing module 720 is specifically configured to:
  when a channel state of the unlicensed cell is greater than or equal to a preset threshold, adjust the serving cell, so that the unlicensed cell is allowed to be used by the terminal for the first service or the first control information.

Optionally, the processing module 720 is specifically configured to:
  adjust, based on current load of the terminal, the serving cell that is allowed or forbidden to be used by the terminal for the first service or the first control information.

Optionally, the processing module 720 is specifically configured to: when the current load of the terminal is greater than or equal to a preset threshold, adjust the serving cell, so that an unlicensed cell is allowed to be used by the first terminal for the first service or the first control information.

Optionally, the transceiver module 710 is further configured to receive indication information, where the indication information is used to indicate the serving cell that is allowed or forbidden to be used by the terminal for the first service or the first control information.

The processing module 720 is specifically configured to:
adjust, based on the indication information, the serving cell that is allowed or forbidden to be used by the terminal for the first service or the first control information.

Optionally, the indication information includes a serving cell identifier, a cell list identifier, or a cell type identifier, and a cell list corresponding to the cell list identifier includes at least one serving cell identifier.

Optionally, the processing module 720 is specifically configured to:
adjust, in a packet data convergence protocol PDCP entity, the serving cell that is allowed or forbidden to be used by the terminal for the first service or the first control information, where the PDCP entity is associated with at least two RLC entities, or is associated with an RLC entity and an LWAAP entity.

The transceiver module 710 is further configured to send the first service or the first control information to a target RLC entity in the at least two RLC entities, where the target RLC entity corresponds to the adjusted serving cell.

Alternatively, the transceiver module 710 is further configured to send the first service or the first control information to an RLC entity corresponding to the adjusted serving cell or to an LWAAP entity corresponding to the adjusted serving cell.

Optionally, the processing module 720 is specifically configured to:
adjust, at a media access control MAC layer, the serving cell that is allowed or forbidden to be used by the terminal for the first service or the first control information.

Optionally, the configuration information is used to indicate a plurality of lists of serving cells that are allowed or forbidden to be used by the terminal for the first service or the first control information, and the adjusted serving cell is a serving cell in one of the plurality of lists of the serving cells that are indicated by the configuration information.

Optionally, the first control information or the second control information includes at least one of signaling radio bearer SRB bearer signaling, common control channel CCCH bearer signaling, service data adaptation protocol SDAP signaling, packet data convergence protocol PDCP signaling, radio link control protocol RLC signaling, and media access control MAC signaling.

For more detailed descriptions of the transceiver module 710 and the processing module 720, refer to related descriptions in the foregoing method embodiments. Details are not described herein again.

Figure 10:
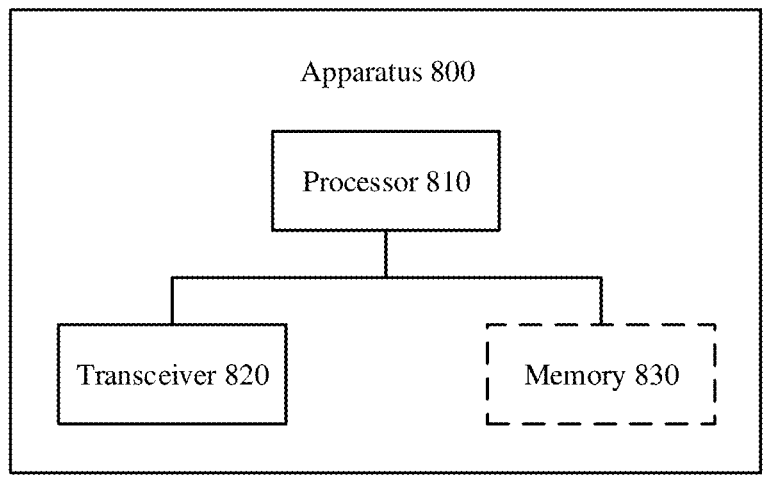
FIG. 10 is a schematic diagram of a structure of a signal transmission apparatus according to an embodiment of this application.

FIG. 10 shows a data processing apparatus 800 according to an embodiment of this application. The apparatus 800 may be the terminal in FIG. 1. The apparatus may use a hardware architecture shown in FIG. 10. The apparatus may include a processor 810 and a transceiver 830. Optionally, the apparatus may further include a memory 840. The processor 810, the transceiver 830, and the memory 840 communicate with each other by using an internal connection path. A related function implemented by the processing module 720 in FIG. 9 may be implemented by the processor 810, and a related function implemented by the transceiver module 710 may be implemented by the processor 810 by controlling the transceiver 830.

Optionally, the processor 810 may be a general-purpose central processing unit (central processing unit, CPU), a microprocessor, an application-specific integrated circuit (application-specific integrated circuit, ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data, and the central processing unit may be configured to: control a data processing apparatus (for example, a base station, a terminal, or a chip), execute a software program, and process data of the software program.

Optionally, the processor 810 may include one or more processors, for example, include one or more central processing units (central processing units, CPU). When the processor is one CPU, the CPU may be a single-core CPU, or may be a multi-core CPU.

The transceiver 830 is configured to send and receive data and/or a signal, and receive data and/or a signal. The transceiver may include a transmitter and a receiver. The transmitter is configured to send data and/or a signal, and the receiver is configured to receive data and/or a signal.

The memory 840 includes but is not limited to a random access memory (random access memory, RAM), a read-only memory (read-only memory, ROM), an erasable programmable memory (erasable programmable read only memory, EPROM), and a compact disc read-only memory (compact disc read-only memory, CD-ROM). The memory 840 is configured to store related instructions and data.

The memory 840 is configured to store program code and data of the terminal, and may be a separate device or integrated into the processor 810.

Specifically, the processor 810 is configured to control the transceiver to perform information transmission with the terminal. For details, refer to the description in the foregoing method embodiments. Details are not described herein again.

During specific implementation, in an embodiment, the apparatus 800 may further include an output device and an input device. The output device communicates with the processor 810, and may display information in a plurality of manners. For example, the output device may be a liquid crystal display (liquid crystal display, LCD), a light emitting diode (light emitting diode, LED) display device, a cathode ray tube (cathode ray tube, CRT) display device, a projector (projector), or the like. When communicating with the processor 810, the input device may receive an input from a user in a plurality of manners. For example, the input device may be a mouse, a keyboard, a touchscreen device, or a sensor device.

It may be understood that FIG. 10 shows merely a simplified design of the data processing apparatus. During actual application, the apparatus may further include other necessary components, including but not limited to any quantity of transceivers, processors, controllers, memories, and the like, and all terminals that can implement this application shall fall within the protection scope of this application.

In a possible design, the apparatus 800 may be a chip, for example, may be a communications chip that can be used in a terminal, and is configured to implement a related function of the processor 810 in the terminal. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiment.

Figure 11:
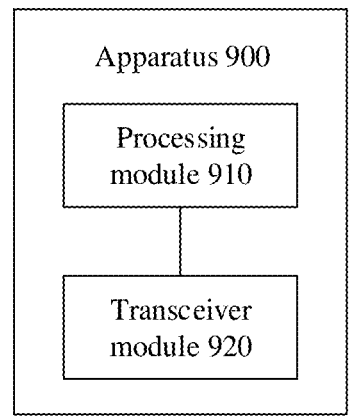
FIG. 11 is a schematic block diagram of a signal transmission apparatus according to another embodiment of this application.

FIG. 11 is a schematic block diagram of a data processing apparatus 900 according to an embodiment of this application.

It should be understood that the apparatus 900 may correspond to the network device shown in FIG. 1 or the chip in the network device, or the network device in the embodiment shown in FIG. 1 or the chip in the network device, and may have any function of the network device in the method. The apparatus 900 includes a processing module 910 and a transceiver module 920.

The processing module 910 is configured to determine a serving cell that is allowed or forbidden to be used by a terminal for a first service or first control information.

The transceiver module 920 is configured to send indication information to the terminal, where the indication information is used to indicate the serving cell that is allowed or forbidden to be used by the terminal for the first service or the first control information.

Optionally, the indication information includes a serving cell identifier, a cell list identifier, or a cell type identifier, and a cell list corresponding to the cell list identifier includes at least one serving cell identifier.

Optionally, the processing module 910 is specifically configured to:
determine, based on a detection result of detecting whether a second service or second control information arrives at the terminal, the serving cell that is allowed or forbidden to be used by the terminal for the first service or the first control information.

Optionally, the second service or the second control information is a service or control information whose transmission delay requirement is less than or equal to a preset delay threshold, and the first service or the first control information is a service or control information whose transmission delay requirement is greater than the preset delay threshold; or a priority of the second service or the second control information is higher than a priority of the first service or the first control information; or a priority level of the second service or the second control information is higher than a preset priority level.

Optionally, the processing module 910 is specifically configured to determine, based on a current channel state, the serving cell that is allowed or forbidden to be used by the terminal for the first service or the first control information, where the channel state is a state of a channel corresponding to an unlicensed cell and/or a state of a channel corresponding to a licensed cell.

Optionally, the processing module 910 is specifically configured to: if the channel state of the unlicensed cell is greater than or equal to a preset threshold, determine that the serving cell that is allowed to be used by the terminal for the first service or the first control information is an unlicensed cell.

Optionally, the processing module 910 is specifically configured to determine, based on current load of the terminal, the serving cell that is allowed or forbidden to be used by the terminal for the first service or the first control information.

Optionally, the processing module 910 is specifically configured to: when current load of the terminal is greater than or equal to a preset threshold, determine that the serving cell that is allowed to be used by the terminal for the first service or the first control information is an unlicensed cell.

Optionally, the first control information or the second control information includes at least one of signaling radio bearer SRB bearer signaling, common control channel CCCH bearer signaling, service data adaptation protocol SDAP signaling, packet data convergence protocol PDCP signaling, radio link control protocol RLC signaling, and media access control MAC signaling.

Figure 12:
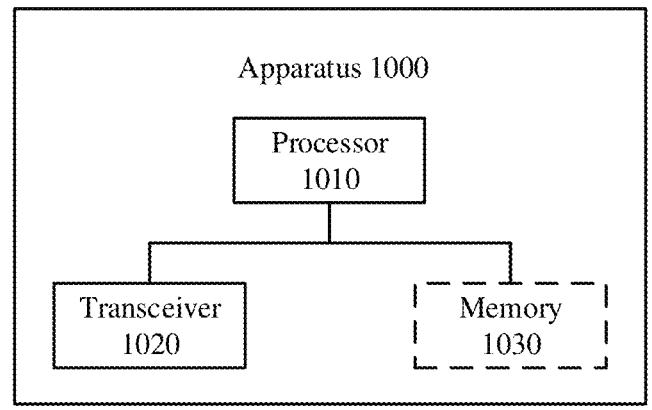
FIG. 12 is a schematic diagram of a structure of a signal transmission apparatus according to an embodiment of this application.

FIG. 12 shows a data processing apparatus 1000 according to an embodiment of this application. The apparatus 1000 may be the network device in FIG. 1. The apparatus may use a hardware architecture shown in FIG. 12. The apparatus may include a processor 1010 and a transceiver 1020. Optionally, the apparatus may further include a memory 1030. The processor 1010, the transceiver 1020, and the memory 1030 communicate with each other by using an internal connection path. A related function implemented by the processing module 910 in FIG. 11 may be implemented by the processor 1010, and a related function implemented by the transceiver module 920 may be implemented by the processor 1010 by controlling the transceiver 1020.

Optionally, the processor 1010 may be a general-purpose central processing unit (central processing unit, CPU), a microprocessor, an application-specific integrated circuit (application-specific integrated circuit, ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data, and the central processing unit may be configured to: control a data processing apparatus (for example, a base station, a terminal, or a chip), execute a software program, and process data of the software program.

Optionally, the processor 1010 may include one or more processors, for example, include one or more central processing units (central processing unit, CPU). When the processor is one CPU, the CPU may be a single-core CPU or a multi-core CPU.

The transceiver 1020 is configured to send and receive data and/or a signal, and receive data and/or a signal. The transceiver may include a transmitter and a receiver. The transmitter is configured to send data and/or a signal, and the receiver is configured to receive data and/or a signal.

The memory 1030 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 1030 is configured to store related instructions and data.

The memory 1030 is configured to store program code and data of the terminal, and may be an independent device or integrated into the processor 1010.

Specifically, the processor 1010 is configured to control the transceiver to perform information transmission with the terminal. For details, refer to the description in the foregoing method embodiments. Details are not described herein again.

During specific implementation, in an embodiment, the apparatus 1000 may further include an output device and an input device. The output device communicates with the processor 1010, and may display information in a plurality of manners. For example, the output device may be a liquid crystal display (liquid crystal display, LCD), a light emitting diode (light emitting diode, LED) display device, a cathode ray tube (cathode ray tube, CRT) display device, a projector (projector), or the like. The input device communicates with the processor 1010, and may receive an input from a user in a plurality of manners. For example, the input device may be a mouse, a keyboard, a touchscreen device, or a sensor device.

It may be understood that FIG. 12 shows merely a simplified design of the data processing apparatus. During actual application, the apparatus may further include other necessary components, including but not limited to any quantity of transceivers, processors, controllers, memories, and the like, and all terminals that can implement this application shall fall within the protection scope of this application.

In a possible design, the apparatus 1000 may be a chip, for example, may be a communications chip that can be used in a terminal, and is configured to implement a related function of the processor 1010 in the terminal. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiment.

Figure 13:
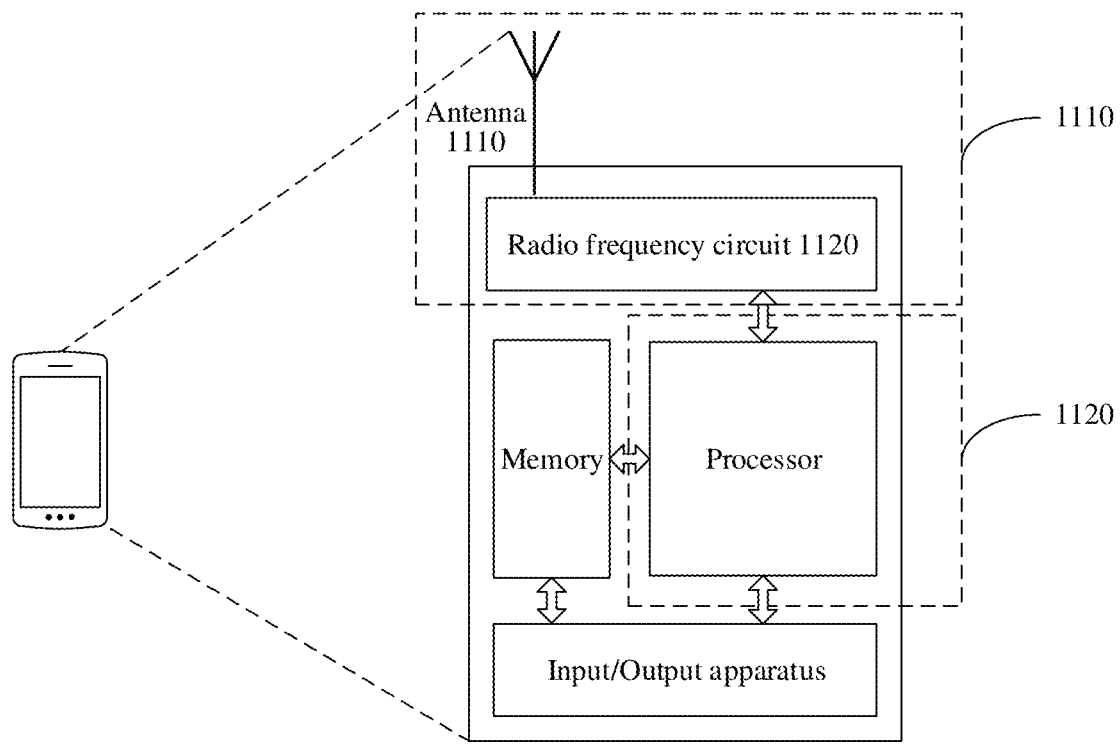
FIG. 13 is a schematic diagram of a structure of a signal transmission apparatus according to an embodiment of this application.

Optionally, when the apparatus in this embodiment is a terminal, FIG. 13 is a simplified schematic diagram of a structure of the terminal. For ease of understanding and illustration, an example in which the terminal is a mobile phone is used in FIG. 13. As shown in FIG. 13, the terminal includes a processor, a memory, a radio frequency circuit, an antenna, and an input/output apparatus. The processor is mainly configured to process a communications protocol and communication data, control the terminal, execute a software program, process data of a software program, or the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data input by a user and output data to the user. It should be noted that some types of terminals may not have an input/output apparatus.

When data needs to be sent, the processor performs baseband processing on to-be-sent data, and outputs a baseband signal to the radio frequency circuit. The radio frequency circuit performs radio frequency processing on the baseband signal and then sends a radio frequency signal to the outside in a form of electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 13. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal, and the processor that has a processing function may be considered as a processing unit of the terminal. As shown in FIG. 13, the terminal includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, and the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 1110 is configured to perform a sending operation and a receiving operation on a terminal side in the foregoing method embodiment, and the processing unit 1120 is configured to perform an operation other than the receiving/sending operation of the terminal in the foregoing method embodiment.

For example, in an implementation, the processing unit 1120 is configured to perform the processing step 302 on the terminal side in FIG. 5. The transceiver unit 1110 is configured to perform the sending operation and the receiving operation in step 301 and step 303 in FIG. 5, and/or the transceiver unit 1110 is further configured to perform other sending and receiving steps on the terminal side in embodiments of this application.

When the apparatus is a chip, the chip includes a transceiver unit and a processing unit. The transceiver unit may be an input/output circuit or a communications interface. The processing unit is a processor, a microprocessor, or an integrated circuit integrated on the chip.

Figure 14:
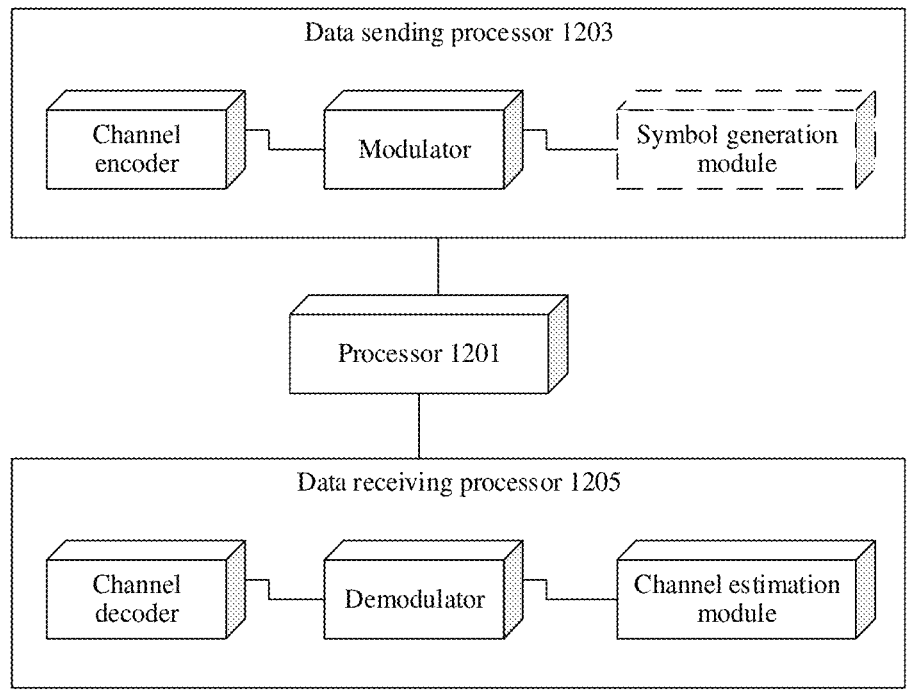
FIG. 14 is a schematic diagram of a structure of a signal transmission apparatus according to another embodiment of this application.

Optionally, when the apparatus is a terminal, reference may be further made to the device shown in FIG. 14. In an example, the device can implement functions similar to those of the processor 810 in FIG. 10. In FIG. 14, the device includes a processor 1201, a data sending processor 1203, and a data receiving processor 1205. The processing module 720 in the foregoing embodiment shown in FIG. 9 may be the processor 1201 in FIG. 14, and completes a corresponding function. The transceiver module 710 in the foregoing embodiment shown in FIG. 9 may be the data sending processor 1203 and the data receiving processor 1205 in FIG. 14. Although FIG. 14 shows a channel encoder and a channel decoder, it may be understood that the modules are merely examples, and do not constitute a limitation on this embodiment.

Figure 15:
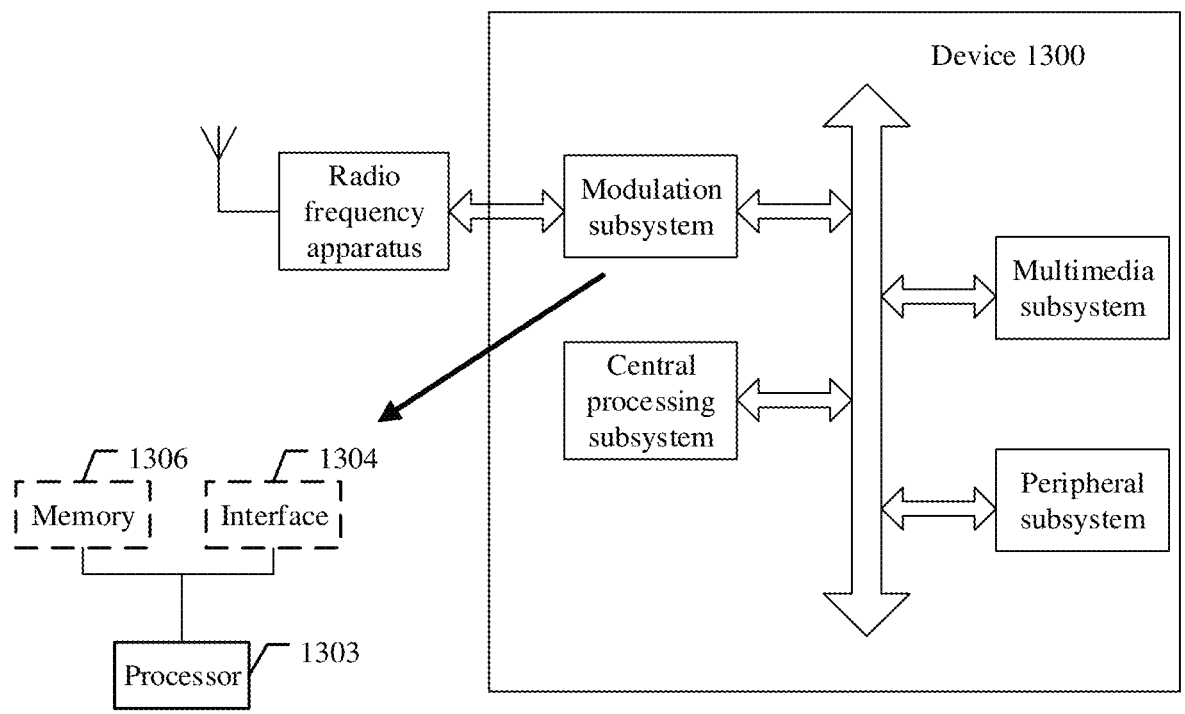
FIG. 15 is a schematic diagram of a structure of a signal transmission apparatus according to another embodiment of this application.

FIG. 15 shows another form of this embodiment. The processing apparatus 1300 includes modules such as a modulation subsystem, a central processing subsystem, and a peripheral subsystem. A communications device in this embodiment may be used as the modulation subsystem in the apparatus. Specifically, the modulation subsystem may include a processor 1303 and an interface 1304. The processor 1303 implements a function of the processing module 710, and the interface 1304 implements a function of the transceiver module 720. In another variation, the modulation subsystem includes a memory 1306, the processor 1303, and a program that is stored in the memory and that is executable in the processor. When the program is executed by the processor, the methods in embodiments are implemented. It should be noted that the memory 1306 may be a nonvolatile memory or a volatile memory. The memory 1306 may be located in the modulation subsystem, or may be located in the processing apparatus 1300, provided that the memory 1306 can be connected to the processor 1303.

Figure 16:
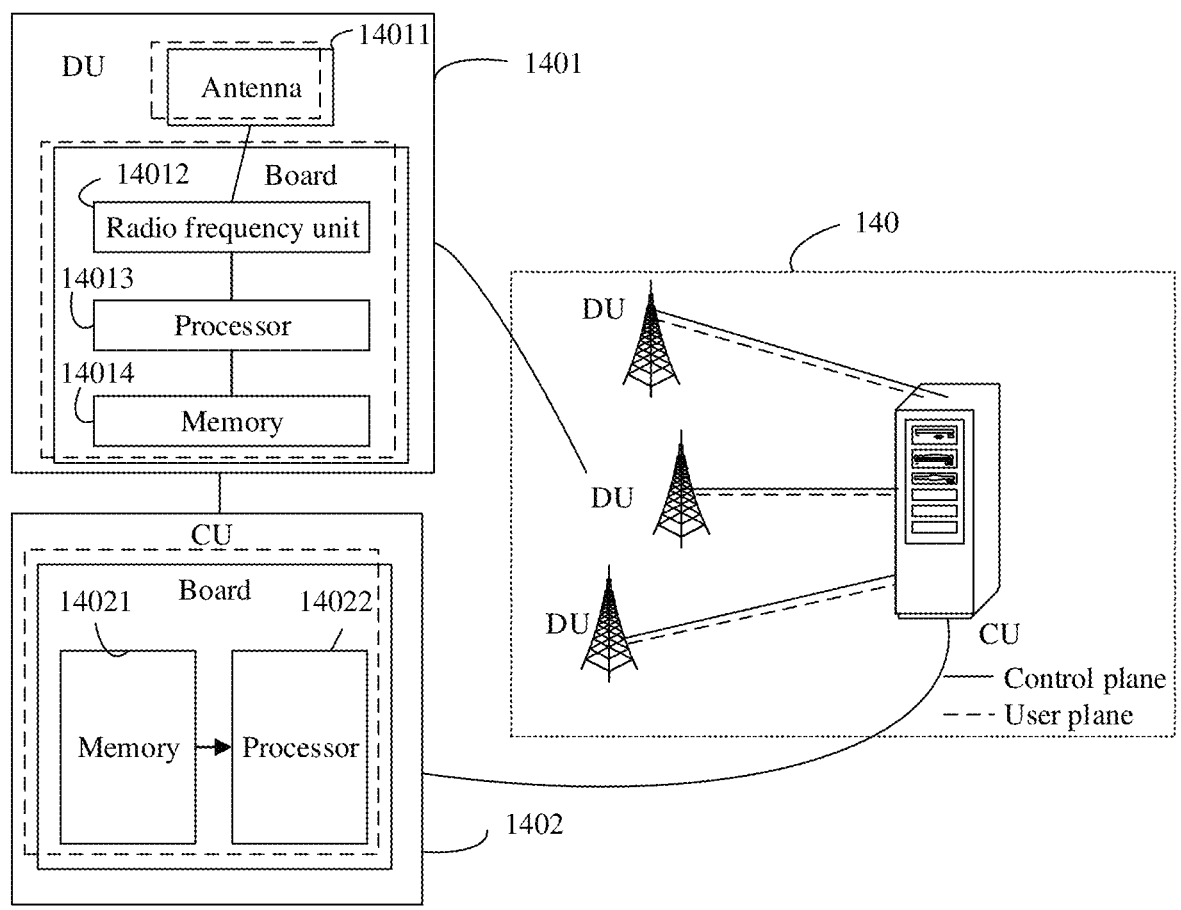
FIG. 16 is a schematic diagram of a structure of a signal transmission apparatus according to another embodiment of this application.

When the apparatus in this embodiment is a network device, the network device may be shown in FIG. 16. For example, the apparatus 140 is a base station. The base station may be applied to the system shown in FIG. 1, and perform functions of the network device in the foregoing method embodiments. The base station 140 may include one or more DUs 1401 and one or more CUs 1402. The CU 1402 may communicate with a next-generation core (NG core, NC). The DU 1401 may include at least one antenna 14011, at least one radio frequency unit 14012, at least one processor 14013, and at least one memory 14014. The DU 1401 is mainly configured to receive and send a radio frequency signal, convert a radio frequency signal and a baseband signal, and perform some baseband processing. The CU 1402 may include at least one processor 14022 and at least one memory 14021. The CU 1402 and the DU 1401 may communicate by using an interface. A control plane (control plane) interface may be Fs-C, for example, F1-C, and a user plane (user plane) interface may be Fs-U, for example, F1-U.

The CU 1402 is mainly configured to perform baseband processing, control the base station, and the like. The DU 1401 and the CU 1402 may be physically disposed together, or may be physically disposed separately, that is, may be distributed base stations. The CU 1402 is a control center of the base station, may also be referred to as a processing unit, and is mainly configured to complete a baseband processing function. For example, the CU 1402 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP layer, such as a radio link control (radio link control, RLC) layer and a media access control (medium access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a MAC layer, and a physical (physical, PHY) layer.

In addition, optionally, the base station 140 may include one or more radio frequency units (RU), one or more DUs, and one or more CUs. The DU may include at least one processor 14013 and at least one memory 14014. The RU may include at least one antenna 14011 and at least one radio frequency unit 14012. The CU may include at least one processor 14022 and at least one memory 14021.

For example, in an implementation, the processor 14013 is configured to perform processing steps on a network device side in FIG. 5. The radio frequency unit 14012 is configured to perform receiving and sending operations in step 301 and step 303 in FIG. 5.

In an example, the CU 1402 may include one or more boards, and a plurality of boards may jointly support a radio access network (for example, a 5G network) of a single access standard, or may separately support radio access networks (such as an LTE network, a 5G network, or another network) of different access standards. The memory 14021 and the processor 14022 may serve one or more boards. In other words, a memory and a processor may be disposed on each board. Alternatively, a plurality of boards may share a same memory and a same processor. In addition, a necessary circuit may be further disposed on each board. The DU 1401 may include one or more boards, and a plurality of boards may jointly support a radio access network (for example, a 5G network) of a single access standard, or may separately support radio access networks (such as an LTE network, a 5G network, or another network) of different access standards. The memory 14014 and the processor 14013 may serve one or more boards. In other words, a memory and a processor may be disposed on each board. Alternatively, a plurality of boards may share a same memory and a same processor. In addition, a necessary circuit may be further disposed on each board.

All or some of the foregoing embodiments may be implemented by using software, hardware, firmware, or any combination thereof. When the software is used to implement embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid-state drive, SSD)), or the like.

It should be understood that, the processor may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, in embodiments of this application, the memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchronous link DRAM, SLDRAM), and a direct rambus random access memory (direct rambus RAM, DR RAM).

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of the present invention. Therefore, "in one embodiment" or "in an embodiment" appearing in the entire specification does not necessarily refer to a same embodiment. In addition, these particular features, structures, or characteristics may be combined in one or more embodiments in any appropriate manner. It should be understood that sequence numbers of the foregoing processes do not mean execution sequences in embodiments of the present invention. The execution sequences of the processes should be determined based on functions and internal logic of the processes, and should not constitute any limitation on the implementation processes of embodiments of the present invention.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may perform communication by using a local and/or remote process and according to, for example, a signal having one or more data packets (for example, data from two components interacting with another component in a local system, a distributed system, and/or across a network such as the internet interacting with other systems by using the signal).

It should be further understood that "first", "second", and various numerical symbols in this specification are merely used for distinguishing for ease of description, and are not intended to limit the scope of embodiments of this application.

It should be understood that the term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments. Details are not described herein again.

In several embodiments provided in this application, it should be understood that the disclosed system, the apparatus, and the method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, the functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
   receiving configuration information from a network device, wherein the configuration information is used to indicate a serving cell that is allowed or forbidden to be used by a terminal for a first service or first control information;
   adjusting the serving cell that is allowed or forbidden to be used by the terminal for the first service or the first control information, wherein the adjusting the serving cell that is allowed or forbidden to be used by the terminal for the first service or the first control information comprises:
      adjusting, based on a current load of the terminal, the serving cell that is allowed or forbidden to be used by the terminal for the first service or the first control information; and
   transmitting the first service or the first control information by using an adjusted serving cell.

2. The method according to claim 1, wherein the adjusting the serving cell that is allowed or forbidden to be used by the terminal for the first service or the first control information further comprises:
   in response to an arrival of a second service or second control information, adjusting the serving cell that is allowed or forbidden to be used by the terminal for the first service or the first control information.

3. The method according to claim 2, wherein
   the second service or the second control information has a transmission delay requirement that is less than or equal to a preset delay threshold, and the first service or the first control information has a transmission delay requirement that is greater than the preset delay threshold, or
   a priority of the second service or the second control information is higher than a priority of the first service or the first control information, or
   a priority level of the second service or the second control information is higher than a preset priority level.

4. The method according to claim 1, wherein the adjusting the serving cell that is allowed or forbidden to be used by the terminal for the first service or the first control information further comprises:
   adjusting, based on a current channel state, the serving cell that is allowed or forbidden to be used by the terminal for the first service or the first control information, wherein the current channel state is at least one of a state of a channel corresponding to an unlicensed cell or a state of a channel corresponding to a licensed cell.

5. The method according to claim 4, wherein the adjusting, based on the current channel state, the serving cell that is allowed or forbidden to be used by the terminal for the first service or the first control information comprises:
   in response to a channel state of the unlicensed cell being greater than or equal to a preset threshold, adjusting the serving cell, so that the unlicensed cell is allowed to be used by the terminal for the first service or the first control information.

6. The method according to claim 1, wherein the adjusting, based on the current load, the serving cell that is allowed or forbidden to be used by the terminal for the first service or the first control information comprises:
   in response to the current load of the terminal being greater than or equal to a preset threshold, adjusting the serving cell, so that an unlicensed cell is allowed to be used by the terminal for the first service or the first control information.

7. The method according to claim 1, further comprising:
   receiving indication information, wherein the indication information is used to indicate the serving cell that is allowed or forbidden to be used by the terminal for the first service or the first control information; and the adjusting the serving cell that is allowed or forbidden to be used by the terminal for the first service or the first control information comprises:
   adjusting, based on the indication information, the serving cell that is allowed or forbidden to be used by the terminal for the first service or the first control information.

8. The method according to claim 7, wherein the indication information comprises a serving cell identifier, a cell list identifier, or a cell type identifier, and a cell list corresponding to the cell list identifier comprises at least one serving cell identifier.

9. The method according to claim 1, wherein the adjusting the serving cell that is allowed or forbidden to be used by the terminal for the first service or the first control information further comprises:
   adjusting, in a packet data convergence protocol (PDCP) entity, the serving cell that is allowed or forbidden to be used by the terminal for the first service or the first control information, wherein the PDCP entity is associated with at least two radio link control (RLC) entities, or the PDCP entity is associated with an RLC entity and a long-term evolution-wireless local network aggregation adaptation protocol (LWAAP) entity; and
   sending the first service or the first control information to a target RLC entity in the at least two RLC entities, wherein the target RLC entity corresponds to the adjusted serving cell; or
   sending the first service or the first control information to a RLC entity corresponding to the adjusted serving cell or to an LWAAP entity corresponding to the adjusted serving cell.

10. An apparatus, comprising:
   one or more processors; and
   a non-transitory computer readable storage medium coupled to the one or more processors, the non-transitory computer readable storage medium having instructions stored thereon that, when executed by the one or more processors, cause the apparatus to:
   determine a serving cell that is allowed or forbidden to be used by a terminal for a first service or first control information based on a current load of the terminal, wherein the apparatus is caused to determine the serving cell that is allowed or forbidden to be used by the terminal for the first service or the first control information by:
      determining, based on a current load of the terminal, the serving cell that is allowed or forbidden to be used by the terminal for the first service or the first control information; and
   send indication information to the terminal, wherein the indication information is used to indicate the serving cell that is allowed or forbidden to be used by the terminal for the first service or the first control information.

11. The apparatus according to claim 10, wherein the indication information comprises a serving cell identifier, a cell list identifier, or a cell type identifier, and a cell list corresponding to the cell list identifier comprises at least one serving cell identifier.

12. The apparatus according to claim 10, wherein the apparatus is further caused to determine the serving cell that is allowed or forbidden to be used by the terminal for the first service or the first control information by:
   determining, based on a detection result of whether a second service or second control information arrives at the terminal, the serving cell that is allowed or forbidden to be used by the terminal for the first service or the first control information.

13. The apparatus according to claim 12, wherein
   the second service or the second control information has a transmission delay requirement that is less than or equal to a preset delay threshold, and the first service or the first control information has a transmission delay requirement that is greater than the preset delay threshold, or
   a priority of the second service or the second control information is higher than a priority of the first service or the first control information, or
   a priority level of the second service or the second control information is higher than a preset priority level.

14. The apparatus according to claim 10, wherein the apparatus is further caused to determine the serving cell that is allowed or forbidden to be used by the terminal for the first service or the first control information by:
   determining, based on a current channel state, the serving cell that is allowed or forbidden to be used by the terminal for the first service or the first control information, wherein the current channel state is at least one of a state of a channel corresponding to an unlicensed cell or a state of a channel corresponding to a licensed cell.

15. The apparatus according to claim 14, wherein the determining, based on the current channel state, the serving cell that is allowed or forbidden to be used by the terminal for the first service or the first control information comprises:
   in response to a channel state of the unlicensed cell being greater than or equal to a preset threshold, determining that the serving cell that is allowed to be used by the terminal for the first service or the first control information is the unlicensed cell.

16. The apparatus according to claim 10, wherein the determining, based on the current load, the serving cell that is allowed or forbidden to be used by the terminal for the first service or the first control information comprises:
   in response to the current load of the terminal being greater than or equal to a preset threshold, determining that the serving cell that is allowed to be used by the terminal for the first service or the first control information is an unlicensed cell.

17. The apparatus according to claim 10, wherein the first control information comprises at least one of signaling radio bearer (SRB) bearer signaling, common control channel (CCCH) bearer signaling, service data adaptation protocol (SDAP) signaling, packet data convergence protocol (PDCP) signaling, radio link control protocol (RLC) signaling, or media access control (MAC) signaling.

18. A non-transitory computer readable storage medium having instructions stored thereon that, when executed by a processor, cause an apparatus to:
   receive configuration information from a network device, wherein the configuration information is used to indicate a serving cell that is allowed or forbidden to be used by a terminal for a first service or first control information;
   adjust the serving cell that is allowed or forbidden to be used by the terminal for the first service or the first control information, wherein the adjusting the serving cell that is allowed or forbidden to be used by the terminal for the first service or the first control information comprises:

adjusting, based on a current load of the terminal, the serving cell that is allowed or forbidden to be used by the terminal for the first service or the first control information; and transmit the first service or the first control information by using an adjusted serving cell.

19. The non-transitory computer readable storage medium according to claim 18, wherein the apparatus is further caused to:

receive indication information, wherein the indication information is used to indicate the serving cell that is allowed or forbidden to be used by the terminal for the first service or the first control information; and adjust the serving cell that is allowed or forbidden to be used by the terminal for the first service or the first control information based on the indication information.

20. The non-transitory computer readable storage medium according to claim 19, wherein the indication information comprises a serving cell identifier, a cell list identifier, or a cell type identifier, and a cell list corresponding to the cell list identifier comprises at least one serving cell identifier.

\* \* \* \* \*